US012573390B2

(12) United States Patent
Shin

(10) Patent No.: US 12,573,390 B2
(45) Date of Patent: Mar. 10, 2026

(54) SERVICE MANAGEMENT SYSTEM AND SERVICE MANAGEMENT METHOD

(71) Applicants: Hyundai Motor Company, Seoul (KR); Kia Corporation, Seoul (KR)

(72) Inventor: Seung Min Shin, Siheung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 351 days.

(21) Appl. No.: 18/133,743

(22) Filed: Apr. 12, 2023

(65) Prior Publication Data

US 2023/0335130 A1 Oct. 19, 2023

(30) Foreign Application Priority Data

Apr. 13, 2022 (KR) ........................ 10-2022-0045894

(51) Int. Cl.
G10L 15/22 (2006.01)
G10L 15/30 (2013.01)
G10L 15/18 (2013.01)

(52) U.S. Cl.
CPC .............. G10L 15/22 (2013.01); G10L 15/30 (2013.01); *G10L 15/1815* (2013.01); *G10L 2015/223* (2013.01)

(58) Field of Classification Search
USPC .......................... 704/246, 247, 251, 252, 275
See application file for complete search history.

(56) References Cited

U.S. PATENT DOCUMENTS

| | | | |
|---|---|---|---|
| 10,990,701 B2 | 4/2021 | Dyor et al. | |
| 11,483,317 B1 * | 10/2022 | Bolignano | ........... G06F 21/577 |
| 11,509,658 B1 * | 11/2022 | Kulkarni | .............. H04W 12/60 |
| 2011/0276893 A1 | 11/2011 | Yambal et al. | |
| 2015/0261391 A1 | 9/2015 | Herlitz et al. | |
| 2017/0140748 A1 | 5/2017 | Roberts et al. | |
| 2017/0353445 A1 * | 12/2017 | Steeves | ................ H04L 9/3247 |
| 2019/0042185 A1 | 2/2019 | Young | |
| 2019/0179912 A1 * | 6/2019 | Schouten | ................ G06F 16/14 |
| 2019/0347356 A1 | 11/2019 | Lindquist et al. | |
| 2020/0357382 A1 | 11/2020 | Ogawa et al. | |

* cited by examiner

*Primary Examiner* — Leonard Saint-Cyr
(74) *Attorney, Agent, or Firm* — Banner & Witcoff, Ltd.

(57) ABSTRACT

Disclosed herein is a service management system and method. The method includes receiving, by a computing device, a request for a service from at least one client of a plurality of clients, wherein the request indicates an input parameter; converting, based on at least one request conversion rule, the input parameter to a converted parameter; generating, based on the converted parameter and based on at least one action generation rule associated with the at least one client, an action corresponding to the request and associated with the at least one client; generating, based on the generated action and based on at least one service conversion rule, an instruction signal requesting the service for the at least one client; and transmitting, to at least one of a plurality of service providers, the instruction signal.

21 Claims, 28 Drawing Sheets

Figure 2:
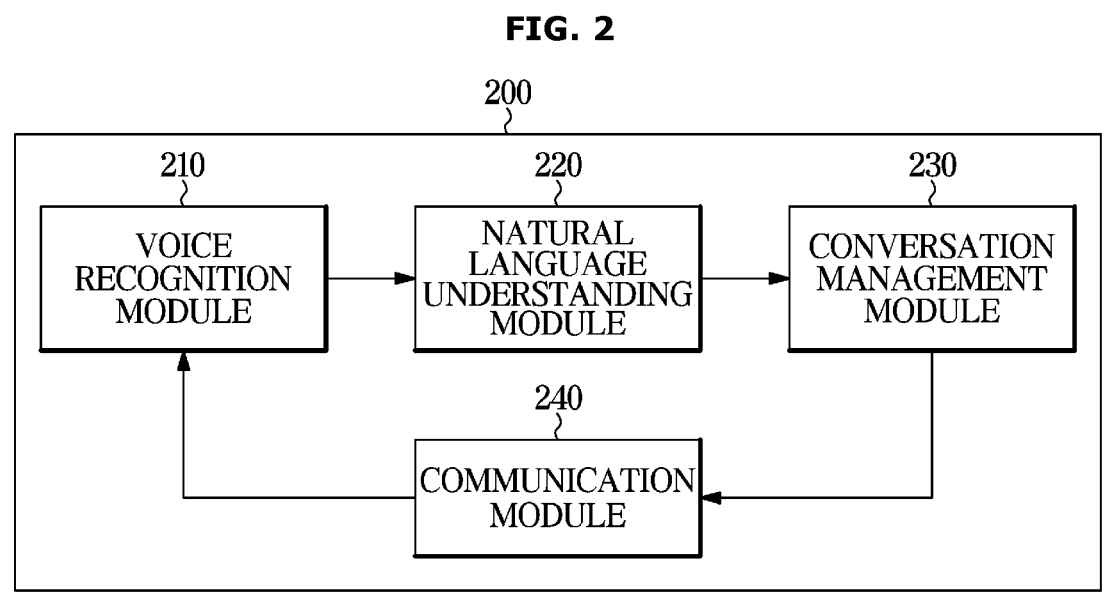

VOICE
RECOGNITION
MODULE

220

NATURAL
LANGUAGE
UNDERSTANDING
MODULE

230

CONVERSATION
MANAGEMENT
MODULE

240

COMMUNICATION
MODULE

Figure 3:
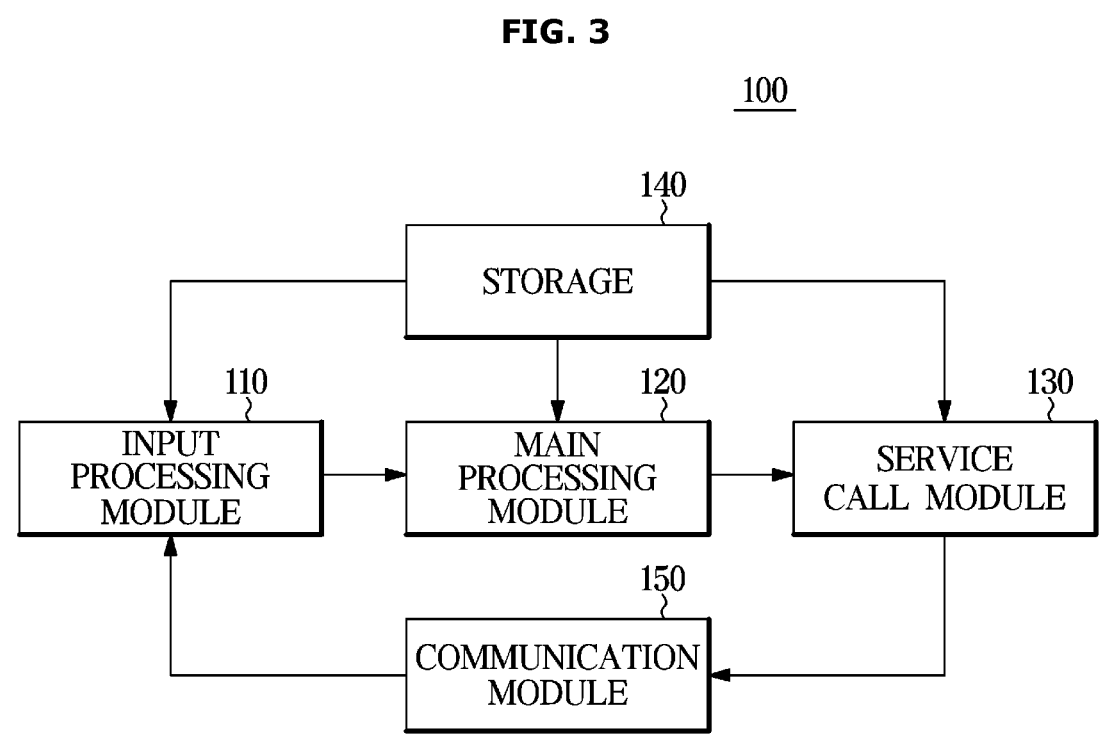

STORAGE

110

INPUT
PROCESSING
MODULE

120

MAIN
PROCESSING
MODULE

130

SERVICE
CALL  MODULE

150

COMMUNICATION
MODULE

START

1010 — RECEIVE REQUEST FOR
SERVICE FROM CLIENT

1020 — CONVERT INPUT PARAMETER
INCLUDED IN RECEIVED REQUEST

1030 — GENERATE ACTION CORRESPONDING
TO RECEIVED REQUEST

1040 — GENERATE CALL SIGNAL FOR CALLING
SERVICE PROVIDER CORRESPONDING
TO GENERATED ACTION

1050 — TRANSMIT CALL SIGNAL
TO SERVICE PROVIDER

END

FIG. 6

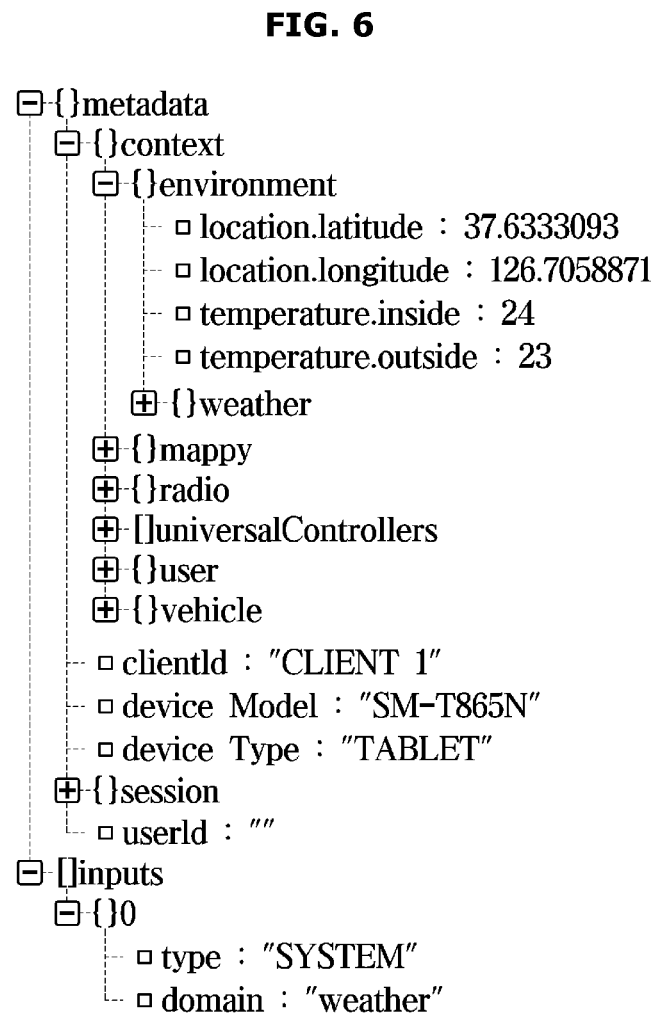

```
⊟·{}metadata
   ⊟·{}context
      ⊟·{}environment
         ┈ □ location.latitude ∶ 37.6333093
         ┈ □ location.longitude ∶ 126.7058871
         ┈ □ temperature.inside ∶ 24
         ┈ □ temperature.outside ∶ 23
      ⊞·{}weather
      ⊞·{}mappy
      ⊞·{}radio
      ⊞·[]universalControllers
      ⊞·{}user
      ⊞·{}vehicle
   ┈ □ clientld ∶ "CLIENT 1"
   ┈ □ device Model ∶ "SM-T865N"
   ┈ □ device Type ∶ "TABLET"
   ⊞·{}session
   └┈ □ userld ∶ ""
⊟·[]inputs
   ⊟·{}0
      ┈ □ type ∶ "SYSTEM"
      └┈ □ domain ∶ "weather"
```

FIG. 7

```
⊟{}metadata
    ⊟{}contexMap
        ┠ ▫ environment.location.latitude ： 37.6333093
        ┗ ▫ environment.location.longitude ： 126.7058871
    ⊞{}session
    ┠ ▫ clientld ： "CLIENT 2"
    ┗ ▫ userld ： "web_demo_user"
⊞{}taskFrame
⊟{}search
    ⊟[]search Types
        ⊟{}0
            ┠ ▫ queryld ： "id1"
            ┗ ▫ domain ： "weather"
```

FIG. 8

| Target input | Value Path | Default |
|---|---|---|
| clientId | Metadata.clientId | empty |
| domain | inputs.0.domain | empty |
| latitude | Metadata.context.environment.location.latitude | empty |
| longitude | Metadata.context.environment.location.longitude | empty |
| location | empty | empty |
| date | empty | today |

```
⊟ []parameters
   ⊟ {}0
      └ ◻ domain : "weather"
   ⊟ {}1
      └ ◻ clientld : "CLIENT 1"
   ⊟ {}2
      └ ◻ latitude : 37.6333093
   ⊟ {}3
      └ ◻ longitude : 126.7058871
   ⊟ {}4
      └ ◻ location : ""
   ⊟ {}5
      └ ◻ date : "today"
```

```
⊟ []parameters
   ⊟ {}0
      └ ▫ domain : "music"
   ⊟ {}1
      └ ▫ clientld : "CLIENT 1"
   ⊟ {}2
      └ ▫ genre : "DRIVE"
   ⊟ {}3
      └ ▫ outsideWeather : "RAINY"
   ⊟ {}4
      └ ▫ currentSeason : "SUMMER"
```

FIG. 16

```
⊟ []parameters
   ⊟ {}0
      └─ □ domain : "music"
   ⊟ {}1
      └─ □ clientld : "CLIENT 2"
   ⊟ {}2
      └─ □ genre : "DRIVE"
   ⊟ {}3
      └─ □ outsideWeather : "RAINY"
   ⊟ {}4
      └─ □ currentSeason : "SUMMER"
```

FIG. 18

| genre | outsideWeather | currentSeason | priority | normalized | targetService |
|-------|----------------|---------------|----------|------------|---------------|
| DRIVE | CLEAR | all | 1 | SUNNY DAY | A MUSIC |
| DRIVE | CLOUDY | all | 2 | GLOOMY | A MUSIC |
| DRIVE | RAINY | all | 3 | DRIVE IN RAIN | B MUSIC |
| DRIVE | all | all | 4 | DRIVE | A MUSIC |

FIG. 19

| genre | outsideWeather | currentSeason | priority | normalized | targetService |
|-------|----------------|---------------|----------|------------|---------------|
| DRIVE | all | SUMMER | 1 | SUMMER | A MUSIC |
| DRIVE | all | all | 2 | DRIVE | A MUSIC |

FIG. 20

| genre | outsideWeather | currentSeason | priority | normalized | targetService |
|---|---|---|---|---|---|
| DRIVE | all | all | 1 | DRIVE | A MUSIC |

Figure 26:
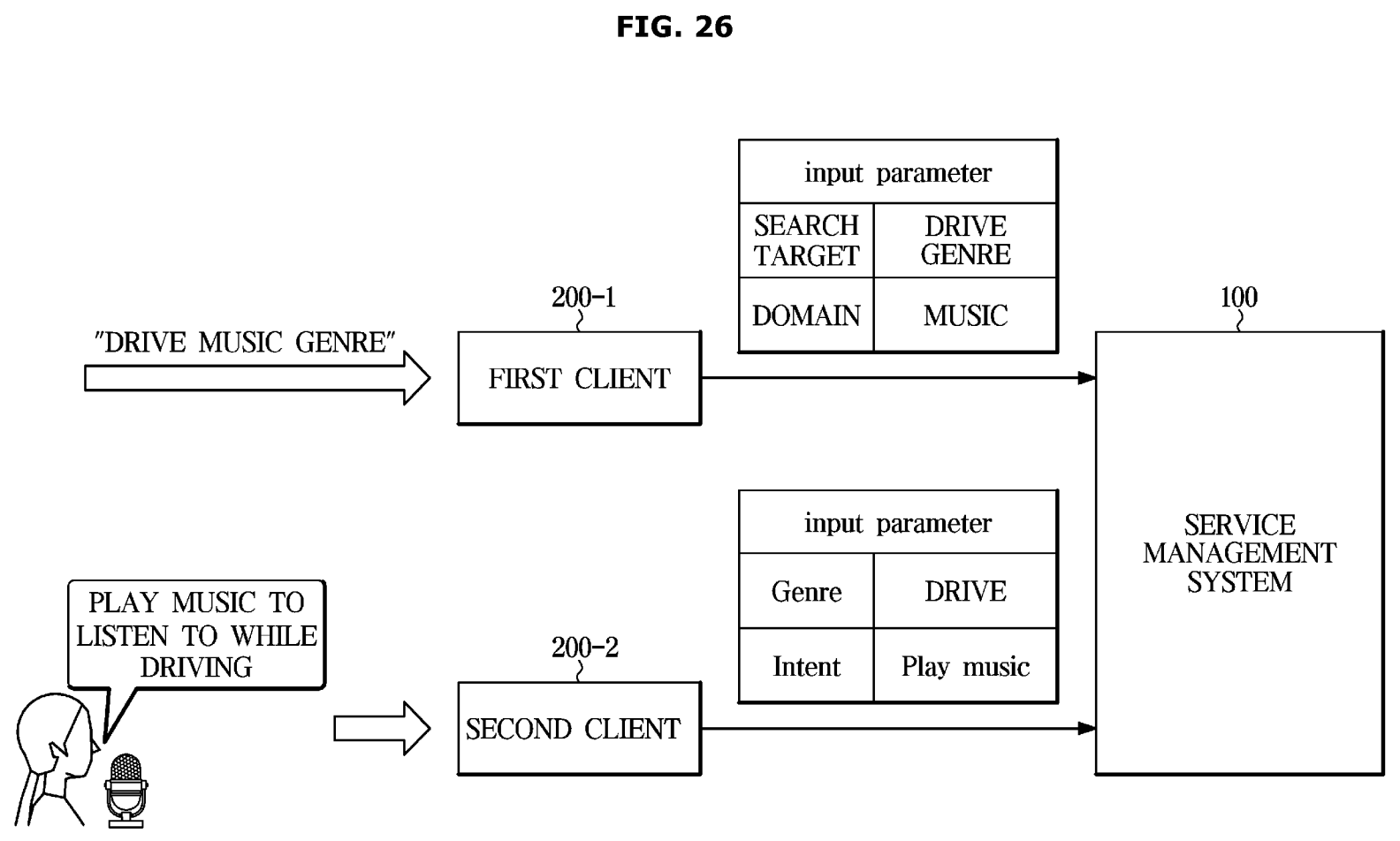

| input parameter | |
|---|---|
| SEARCH TARGET | DRIVE GENRE |
| DOMAIN | MUSIC |

| input parameter | |
|---|---|
| Genre | DRIVE |
| Intent | Play music |

100 ~ SERVICE MANAGEMENT SYSTEM 200-1 ~ FIRST CLIENT 200-2 ~ SECOND CLIENT

"DRIVE MUSIC GENRE"

PLAY MUSIC TO LISTEN TO WHILE DRIVING

FIG. 27

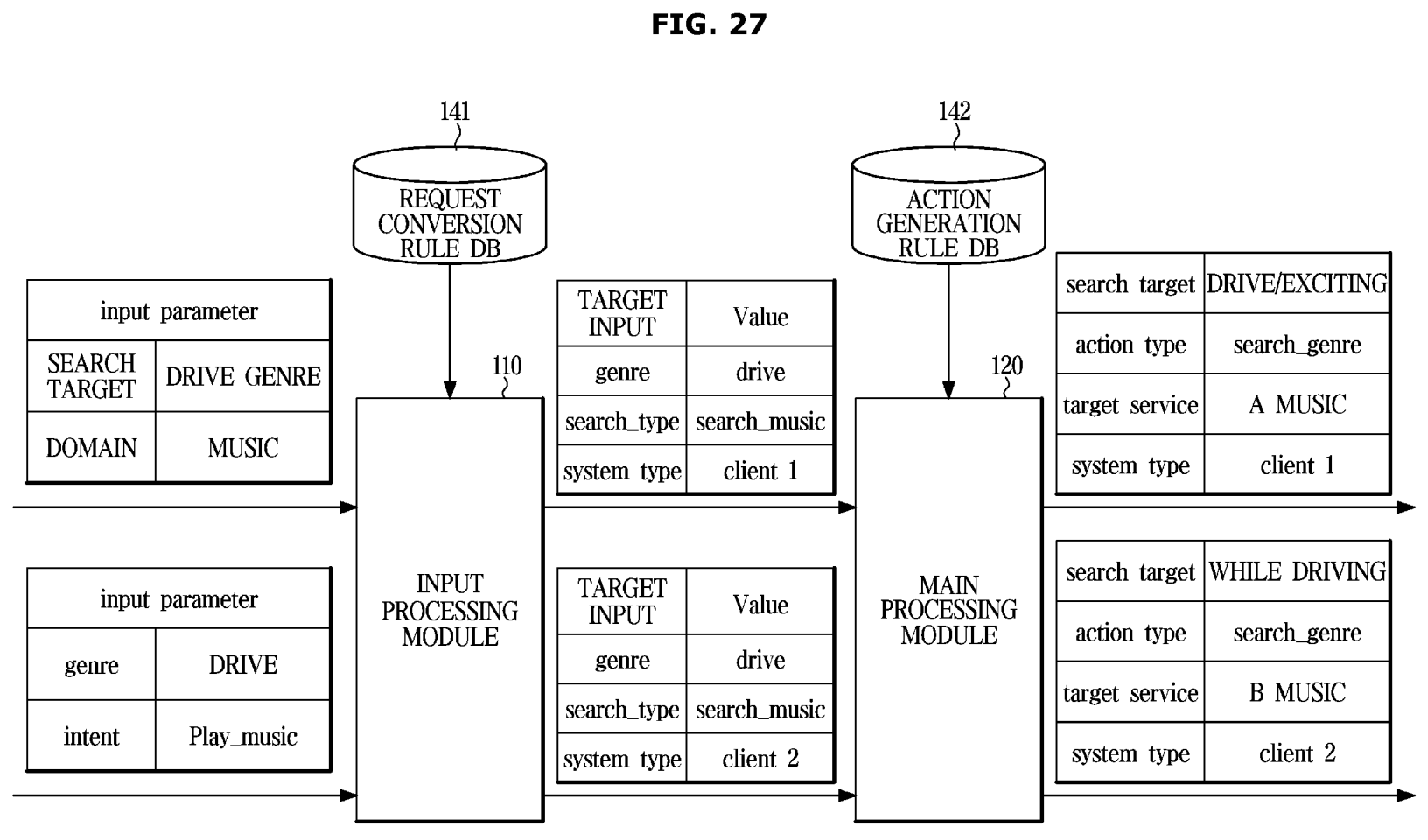

| search target | DRIVE/EXCITING |
|---|---|
| action type | search_genre |
| target service | A MUSIC |
| system type | client 1 |

| search target | WHILE DRIVING |
|---|---|
| action type | search_genre |
| target service | B MUSIC |
| system type | client 2 |

| TARGET INPUT | Value |
|---|---|
| genre | drive |
| search_type | search_music |
| system type | client 1 |

| TARGET INPUT | Value |
|---|---|
| genre | drive |
| search_type | search_music |
| system type | client 2 |

142 — ACTION GENERATION RULE DB

120 — MAIN PROCESSING MODULE

141 — REQUEST CONVERSION RULE DB

110 — INPUT PROCESSING MODULE

| input parameter | DRIVE GENRE |
|---|---|
| SEARCH TARGET | |
| DOMAIN | MUSIC |

| input parameter | DRIVE |
|---|---|
| genre | |
| intent | Play_music |

SERVICE MANAGEMENT SYSTEM AND SERVICE MANAGEMENT METHOD

CROSS-REFERENCE TO RELATED APPLICATION

This application claims the benefit of Korean Patent Application No. 10-2022-0045894, filed on Apr. 13, 2022, in the Korean Intellectual Property Office, the disclosure of which is incorporated herein by reference.

BACKGROUND

1. Field

The present disclosure relates to a service management system and method for processing a request, for a service, transmitted from a client and calling a service provider corresponding to the requested service.

2. Discussion of the Background

A service management system may be connected to a client and a service provider to request the service provider to provide a service that the client desires and receive the service from the service provider.

Here, a plurality of clients may include a dialogue system with an auto speech recognition (ASR) and natural language understanding (NLU) function or an electronic device with a user input/output interface.

For the same service, details of the service that clients desire may not be the same, and details of the same service provided by service providers or information necessary for the service providers to provide the service may not be the same.

SUMMARY

The following summary presents a simplified summary of certain features. The summary is not an extensive overview and is not intended to identify key or critical elements.

It is an aspect of the present disclosure to provide a service management system and method for easily connecting to a new client or a new service provider without developing a new system or updating the system.

It is another aspect of the present disclosure to provide a service management system and method for providing a customized service to a client by allowing the client to directly edit details of a desired service.

Additional aspects of the present disclosure will be set forth in part in the description which follows and, in part, will be obvious from the description, or may be learned by practice of the present disclosure.

A service management system may comprise: one or more processors; and memory storing instructions that, when executed by the one or more processors, cause the service management system to: receive a request for a service from at least one client of a plurality of clients, wherein the request indicates an input parameter; convert, based on at least one request conversion rule, the input parameter to a converted parameter; generate, based on the converted parameter and based on at least one action generation rule associated with the at least one client, an action corresponding to the request and associated with the at least one client; generate, based on the generated action and based on at least one service conversion rule, an instruction signal requesting the service for the at least one client; and transmit, to at least one of a plurality of service providers, the instruction signal.

The at least one action generation rule may comprise at least one parameter of the action linked to the converted parameter. The instructions, when executed by the one or more processors, may cause the service management system to configure the at least one action generation rule to be settable or editable by the at least one client via a web page or an application. The at least one parameter of the action may comprise an indication of a service provider, of the plurality of service providers, corresponding to the action for the at least one client. The at least one service conversion rule may comprise a definition of information and a format that are necessary to request each of the plurality of service providers to provide one or more services. The instructions, when executed by the one or more processors, may cause the service management system to configure the at least one service conversion rule to be settable or editable by the plurality of service providers via a web page or an application. In response to registration of a new service provider in the service management system, the instructions, when executed by the one or more processors, may cause the service management system to configure the at least one service conversion rule settable by the new service provider via a web page or an application. Based on the at least one request conversion rule, the instructions, when executed by the one or more processors, may cause the service management system to convert the input parameter indicated by the request to the converted parameter in a normalized format conforming to the service management system. The at least one request conversion rule may comprise at least one of: a definition of at least one of a path for obtaining a target input value required by the service management system for each of the plurality of clients; or a default value to be used in case that the target input value cannot be obtained. The instructions, when executed by the one or more processors, may cause the service management system to configure the at least one request conversion rule to be settable or editable by the plurality of clients via a web page or an application.

A service management method may comprise: receiving, by a computing device, a request for a service from at least one client of a plurality of clients, wherein the request indicates an input parameter; converting, by the computing device and based on at least one request conversion rule, the input parameter to a converted parameter; generating, by the computing device and based on the converted parameter and based on at least one action generation rule associated with the at least one client, an action corresponding to the request and associated with the at least one client; generating, by the computing device and based on the generated action and based on at least one service conversion rule, an instruction signal requesting the service for the at least one client; and transmitting, by the computing device to at least one of a plurality of service providers, the instruction signal. The at least one action generation rule may be settable or editable by the at least one client.

The at least one action generation rule may comprise at least one parameter of the action linked to the converted parameter. The service management method may further comprise configuring the at least one action generation rule to be settable or editable by the at least one client via a web page or an application. The at least one parameter of the action may comprise an indication of a service provider, of the plurality of service providers, corresponding to the action for the at least one client. The at least one service conversion rule may comprise a definition of information and a format that are necessary to request each of the plurality of service providers to provide one or more services. The service management method may further comprise configuring the at least one service conversion rule to be settable or editable by the plurality of service providers via a web page or an application. The service management method may further comprise, in response to registration of a new service provider in a service management system, configuring the at least one service conversion rule to be settable by the new service provider via a web page or an application. The converting may comprise: converting, based on the at least one request conversion rule, the input parameter indicated by the request to the converted parameter in a normalized format conforming to a service management system. The at least one request conversion rule may comprise at least one of: a definition of at least one of a path for obtaining a target input value required by the service management system for each of the plurality of clients; or a default value to be used in case that the target input value cannot be obtained. The service management method may further comprise configuring the at least one request conversion rule to be settable or editable by the plurality of clients via a web page or an application.

A non-transitory computer-readable storage medium may store instructions that, when executed, cause: receiving a request for a service from at least one client of a plurality of clients, wherein the request indicates an input parameter; converting, based on at least one request conversion rule, the input parameter to a converted parameter; generating, based on the converted parameter and based on at least one action generation rule associated with the at least one client, an action corresponding to the request and associated with the at least one client; generating, based on the generated action and based on at least one service conversion rule, an instruction signal requesting the service for the at least one client; and transmitting, to at least one of a plurality of service providers, the instruction signal. The at least one action generation rule may be settable or editable by the at least one client.

These and other features and advantages are described in greater detail below.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 2 is a block diagram illustrating an example operation of a client connected to a service management system;

FIG. 3 is a block diagram illustrating an example operation of a service management system;

FIGS. 6 and 7 are diagrams illustrating examples of an input parameter transmitted from a client;

FIG. 8 illustrates an example of request conversion rules of a first client;

FIG. 11 is a diagram illustrating an example case in which a user's request is input to a service management system;

FIGS. 15, 16 and 17 are diagrams illustrating examples of an input parameter converted by an input processing module of a service management system;

FIGS. 18, 19 and 20 are diagrams illustrating examples of action generation rules referenced by a main processing module of a service management system;

FIG. 21 is a diagram illustrating an example in which a service management system receives input parameters from first and second clients;

FIG. 22 is a diagram illustrating an operation performed by a service management system, which receives an input parameter, on the basis of request conversion rules and action generation rules;

FIGS. 26, 27 and 28 are diagrams illustrating examples of an operation of a service management system to which a request for a music playback service is input.

DETAILED DESCRIPTION

Figure 1:
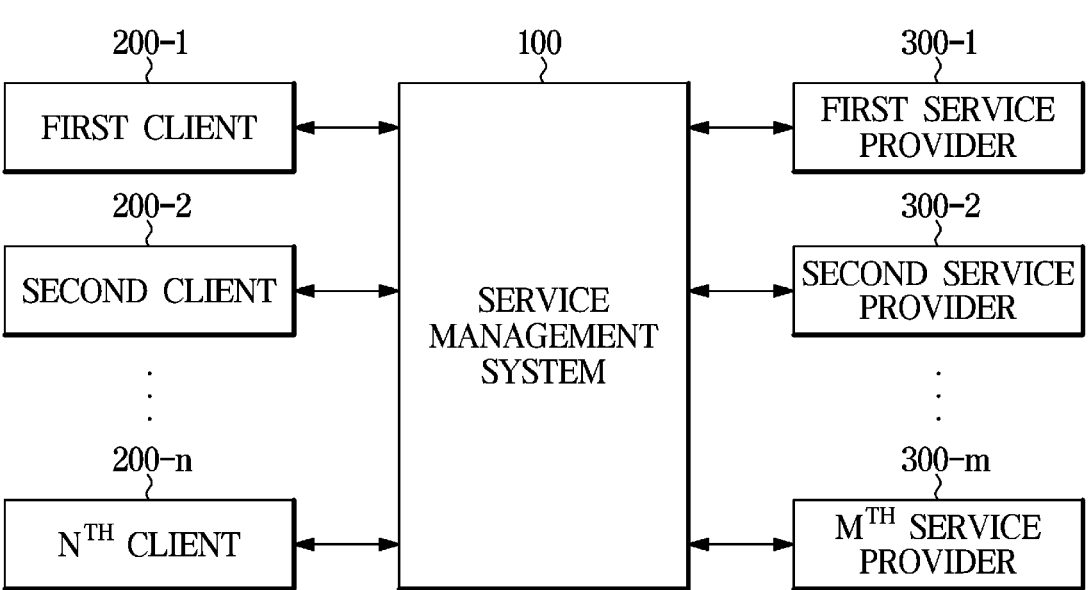
FIG. 1 is a block diagram illustrating an example operation of a service management system.

Various examples described herein and configurations shown in the drawings are examples of the present disclosure, and there may be a variety of modified examples that replace the illustrated features and drawings of the present disclosure at the time of filing the present disclosure.

The same reference numerals or signs in each of the drawings of the present disclosure denote components or elements that perform substantially the same functions.

The terms used herein are only used to describe embodiments and are not intended to limit the present disclosure. As used herein, the singular expressions are intended to include plural forms as well, unless the context clearly dictates otherwise.

It should be understood that terms such as "include," "comprise," or "have," when used herein, specify the presence of stated features, integers, steps, operations, elements, components, or a combination thereof, but do not preclude the presence or addition of one or more features, integers, steps, operations, elements, components, or a combination thereof.

Terms including ordinal numbers such as "first" and "second" used herein may be used to describe various components, but the components are not limited by the terms and the terms are used only to distinguish one component from another. For example, a first component may be referred to as a second component without departing from the scope of the present disclosure, and similarly, a second component may also be referred to as a first component.

The term "and/or" includes a combination of a plurality of related items described herein or any one of the plurality of related items.

Terms such as "unit," "device," "block," "member," and "module" should be understood to mean a unit in which at least one function or operation is processed. For example, the terms may be understood to mean at least one type of hardware such as a field-programmable gate array (FPGA)/ application-specific integrated circuit (ASIC), at least one type of software stored in a memory, or at least one process to be processed by a processor.

Reference numerals assigned to operations are used to distinguish between the operations and are not intended to describe an order of the operations, and thus the operations may be performed in an order different from that described herein unless the context indicates a specific order.

Here, when the expression "at least one" is used to indicate a list of elements, a combination of the elements may be changed. For example, the expression "at least one of a, b, or c" should be understood to indicate only a, only b, only c, both a and b, both a and c, both b and c, or a, b, and c.

Hereinafter, various examples of a service management system and method according to an aspect will be described in detail with reference to the accompanying drawings.

FIG. 1 is a block diagram illustrating an operation of a service management system, and FIG. 2 is a block diagram illustrating an operation of a client connected to a service management system.

Referring to FIG. 1, a service management system 100 may be connectable to clients 200-1, 200-2, . . . , 200-n (n is an integer greater than or equal to 2) and service providers 300-1, 300-2, . . . , 300-m (m is an integer greater than or equal to 2).

The service management system 100 may be embodied as a computing device, such as one or more servers, which is connected to the clients 200-1, 200-2, . . . , 200-n and the service providers 300-1, 300-2, . . . , 300-m through a communication network.

Examples of the clients 200-1, 200-2, . . . , 200-n may include a dialogue system to which a user's request is input in the form of voice, an electronic device to which a user's request is input by manipulating an input device, and the like.

The clients 200-1, 200-2, . . . , 200-n may be any devices capable of being connected to the service management system 100 via/through a communication network and including a user input/output interface via/through which a user's request is input and a service provided from the service management system 100 is output.

The service providers 300-1, 300-2, . . . , 300-m may be entities that may provide a music download and streaming service, a weather information provision service, a navigation service, a service for retrieving other types of information, an online shopping service, and/or a service for downloading and streaming multimedia content, such as movies and dramas.

Types of or the number of services provided by the service providers 300-1, 300-2, . . . , 300-m are not limited, two or more service providers providing the same service may be connected to the service management system 100, and one service provider may provide two or more types of services.

A user may be an end-user of the clients 200-1, 200-2, . . . , 200-n, and may be an end consumer who requests and receives a desired service through the clients 200-1, 200-2, . . . , 200-n or a user terminal connected to the clients 200-1, 200-2, . . . , 200-n.

For example, as shown in FIG. 2, a client 200 may be a dialogue system configured to process a user's voice command to identify the user's request. The user may input the voice command for requesting a desired service through a user terminal including a microphone and a communication module. The voice command input to the user terminal may be transmitted to the client 200 via/through a communication module.

The client 200 may include a voice recognition module 210, a natural language understanding module 220, a conversation management module 230, and a communication module 240.

The voice recognition module 210 may convert a voice command transmitted in the form of an audio signal into text. To this end, the voice recognition module 210 may include a voice recognition engine.

The natural language understanding module 220 may identify a user's intention included in the voice command, e.g., a service requested by the user, on the basis of the text. To this end, the natural language understanding module 220 may include a natural language understanding (NLU) engine.

The NLU engine may classify a domain and an intent corresponding to the voice command and extract an entity or a slot included in the voice command.

The conversation management module 230 may manage a conversation history, update a current conversation state, and generate an accurate system response to the voice command on the basis of the conversation history and the current conversation state.

The conversation management module 230 may include a natural language generator (NLG) engine and a text-to-speech (TTS) engine to generate a system response.

If the user's voice command includes a request for a certain service, the conversation management module 230 may generate a signal for requesting the service.

The communication module 240 may receive the voice command from a user terminal and transmit the signal for requesting the service to the service management system 100.

As described above, a type of the client 200 is not limited. Accordingly, the client 200 is not necessarily limited to a dialogue system that processes a user's voice command.

As described above, the client 200 may be a mobile device or other types of devices, such as a vehicle, through which a user may input a request for a certain service by manipulating an input device and which is capable of transmitting the input request to the service management system 100 and providing the user with the service from the service management system 100.

Figure 4:
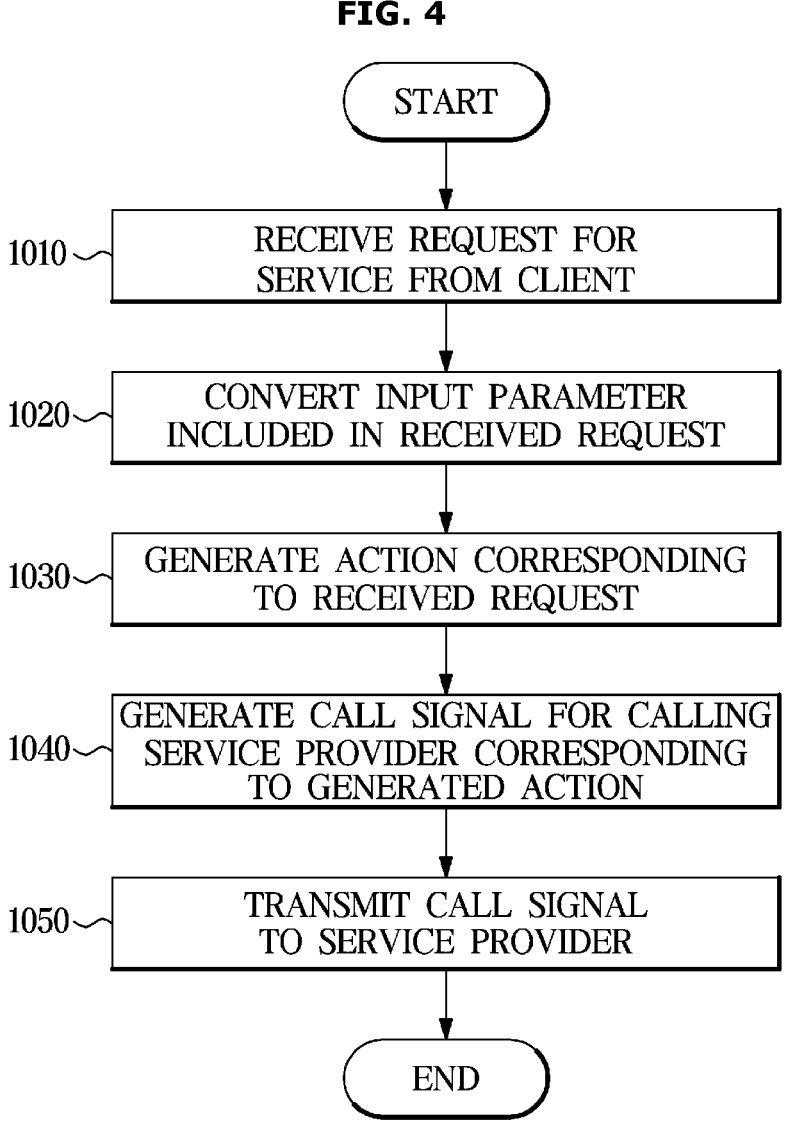
FIG. 4 is a flowchart of an example service management method.

FIG. 3 is a block diagram illustrating an operation of a service management system, and FIG. 4 is a flowchart of an example method for providing a service by a service management system.

Referring to FIG. 3, a service management system 100 may include an input processing module 110, a main processing module 120, a service call module 130, a storage 140, and a communication module 150.

The service management system 100 may include at least one memory storing a program for performing an operation described below and at least one processor for executing the stored program.

The input processing module 110, the main processing module 120, and the service call module 130 may share at least one memory and at least one processor or may use different memories and processors.

The storage 140 may share a memory with the input processing module 110, the main processing module 120, and/or the service call module 130 or may use a different memory and/or a storage device.

A service management method may be performed by the service management system 100. Therefore, the description of the service management method may apply to the service management system 100 and the description of the service management system 100 may also apply to the service management method even when they are not described separately.

The service management system 100 and a service management method using the same will be described together below.

In the service management method (e.g., as shown in FIG. 4), the communication module 150 may receive a request for a service from the client 200 (1010).

The communication module 150 may wirelessly communicate with a base station or an access point (AP) and exchange data with external devices via/through the base station or the AP. The communication module 150 may communicate with one or more computing devices via a wired communication and/or a wireless communication.

For example, the communication module 150 may wirelessly communicate with an AP using Wi-Fi™ (IEEE 802.11 technology standard) or communicate with a base station using CDMA, WCDMA, GSM, Long-Term Evolution (LTE), 5G, WiBro, or the like. The communication module 150 may exchange data with external devices within a short distance using Wi-Fi direct, Bluetooth (Bluetooth®, IEEE 802.15.1 standard), Zigbee (Zigbee®, IEEE 802.15.4 standard), etc. The communication module 150 may provide an interface for service management system 100 and/or a computing device to communicate with a network (e.g., a RAN, or any other network). The communication module 150 may include a modem (e.g., a cable modem), and the external network may include communication links, an external network, an in-home network, a provider's wireless, coaxial, fiber, or hybrid fiber/coaxial distribution system (e.g., a DOCSIS network), or any other desired network. The service management system 100 and/or a computing device may include a location-detecting device, such as a global positioning system (GPS) microprocessor, which may be configured to receive and process global positioning signals and determine, with possible assistance from an external server and antenna, a geographic position of the service management system 100 and/or the computing device.

The communication module 150 may communicate with the clients 200-1, 200-2, . . . , 200-n and the service providers 300-1, 300-2, . . . , 300-m using at least one of the above-described communication methods. The communication module 150 may include communication circuitry. A communication module 150 may also be called a communicator. As described above, the client 200 may transmit a request for a service corresponding to a user's input (voice command or manipulation), and the communication module 150 may receive the request and transmit the request to the input processing module 110.

The input processing module 110 may convert an input parameter included in the received request to a converted parameter (1020). The input processing module 110 may convert a format of the input parameter included in the received request into a format processable by the service management system 100.

A format of a request even for the same service may vary according to the type of the client 200 that requests the service. Thus, the input processing module 110 may normalize (e.g., standardize) the input parameter included in the request transmitted from the client 200 by converting the input parameter into a format processable by the service management system 100. In this case, the input processing module 110 may refer to request conversion rules stored in the storage 140.

The input processing module 110 may convert a result signal provided from the service providers 300-1, 300-2, . . . , 300-m (e.g., shown in FIG. 1) into a format required by the client 200.

The main processing module 120 may generate an action corresponding to the received request (1030).

The main processing module 120 may generate an action for requesting the service providers 300-1, 300-2, . . . , 300-m to provide a service on the basis of a result of the input processing module 110 converting the input parameter. The action may be defined by details thereof, and the details defining the action may be determined by action generation rules stored in the storage 140.

The service call module 130 may generate a call signal for calling a service provider in response to the generated action (1040).

An input format may be different for each of the service providers 300-1, . . . , and 300-m. An input format may be different for each service domain and may be different for each of the service providers 300-1, . . . , 300-m even when they provide the same service domain.

Accordingly, the service call module 130 may generate a call signal for calling a service provider corresponding to the generated action by referring to the service conversion rules stored in the storage 140.

The communication module 150 may transmit a call signal to the service provider (1050).

Figure 5:
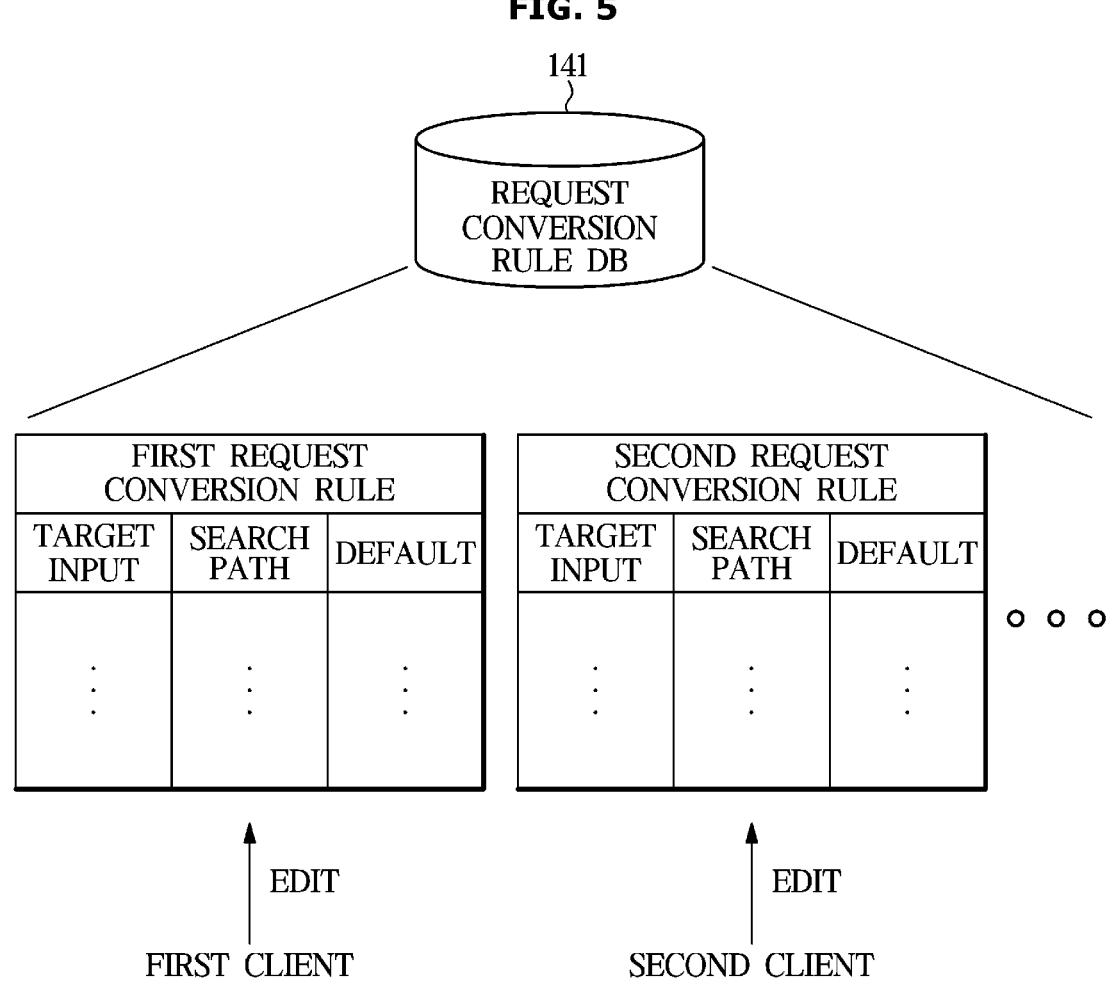
FIG. 5 is a diagram illustrating an example of request conversion rules stored in a storage of a service management system.

FIG. 5 is a diagram illustrating an example of request conversion rules stored in a storage of a service management system. FIGS. 6 and 7 are diagrams illustrating examples of an input parameter transmitted from a client.

Referring to FIG. 5, request conversion rules for converting an input parameter included in a request for each client may be stored in a request conversion rule DB 141 (e.g., stored in the storage 140 shown in FIG. 3). For example, each of the request conversion rules may include a definition of a value path for obtaining a value of a target input and a default value to be used when the value of the target input cannot be obtained. The target input is an input necessary for the service management system 100 to call a certain service.

For example, if input parameters transmitted from a first client 200-1, which may be a mobile device, are the same as those shown in FIG. 6 and input parameters transmitted from a second client 200-2, which may be a dialogue system, are the same as those shown in FIG. 7, formats of the input parameters are different from each other although both the first and second clients 200-1 and 200-2 request a weather information provision service.

Figure 9:
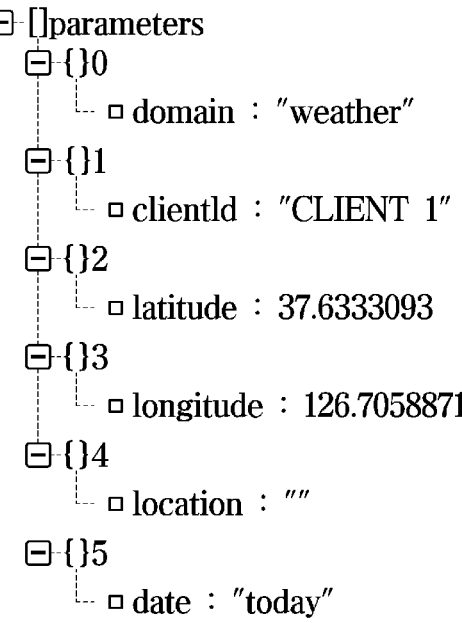
FIG. 9 is a diagram illustrating an example of an input parameter converted according to the request conversion rules of FIG. 8.

FIG. 8 illustrates an example of request conversion rules of a first client. FIG. 9 is a diagram illustrating an example of an input parameter converted according to the request conversion rules of FIG. 8.

For example, if a domain is weather, target inputs defined by the service management system 100 may include a client ID, the domain, a latitude, a longitude, a location, and a date, and a path for obtaining values of the target inputs or a default value may be defined, for example, by the request conversion rules shown in FIG. 8.

The input processing module 110 may normalize an input parameter transmitted from the first client 200-1 (e.g., as shown in FIG. 9) by converting a format of the input parameter with reference to the request conversion rules (e.g., the request conversion rules shown in FIG. 8).

Referring back to FIG. 5, the request conversion rules stored for each client 200 may be edited by each client 200. To this end, the service management system 100 may provide a tool for editing request conversion rules through a web page or an application.

If the client 200 and the service management system 100 are connected to each other, request conversion rules may be set to default values set by the service management system 100, and the client 200 may edit a search path or default value for each target input on a designated web page or an application.

Alternatively or additionally, request conversion rules may be set as desired by the client 200 if the client 200 and the service management system 100 are connected to each other. In this case, the request conversion rules may also be freely edited after they are set.

Figure 10:
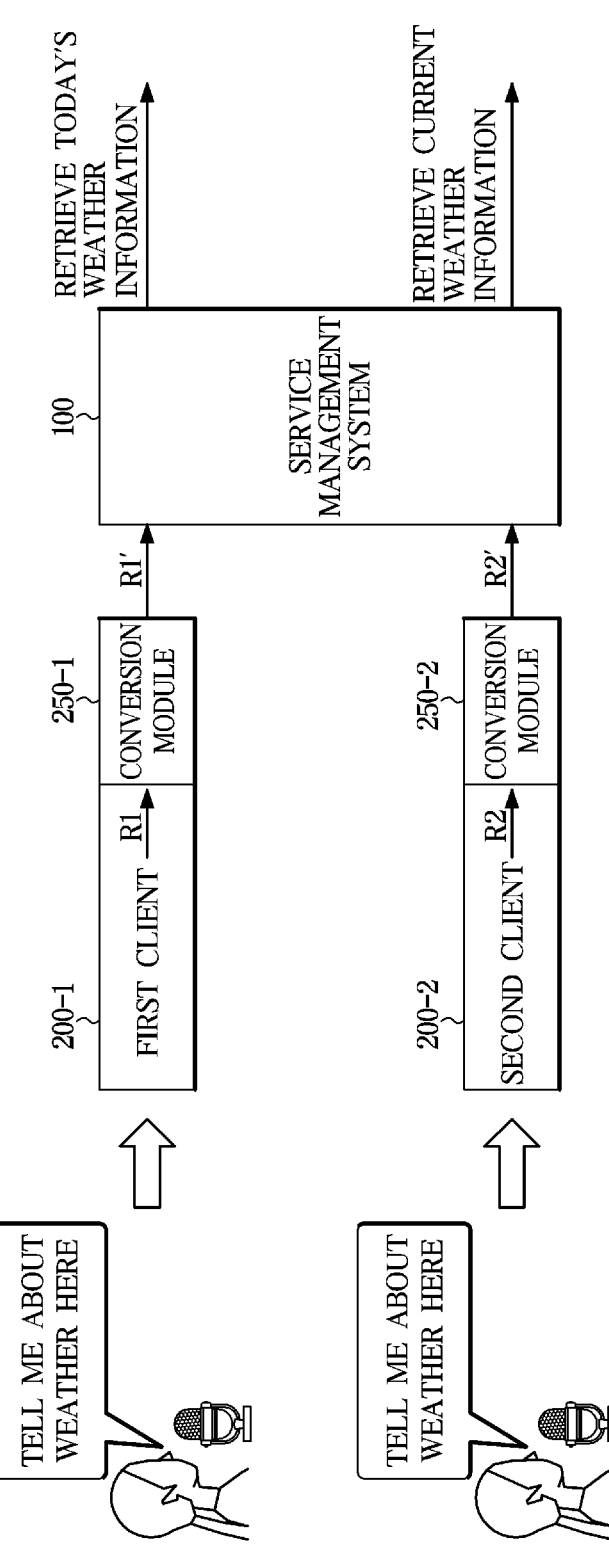
FIG. 10 is a diagram illustrating a case in which a user's request is input to a service management system that does not allow request conversion rules to be set or edited for each client.
Figure 11:
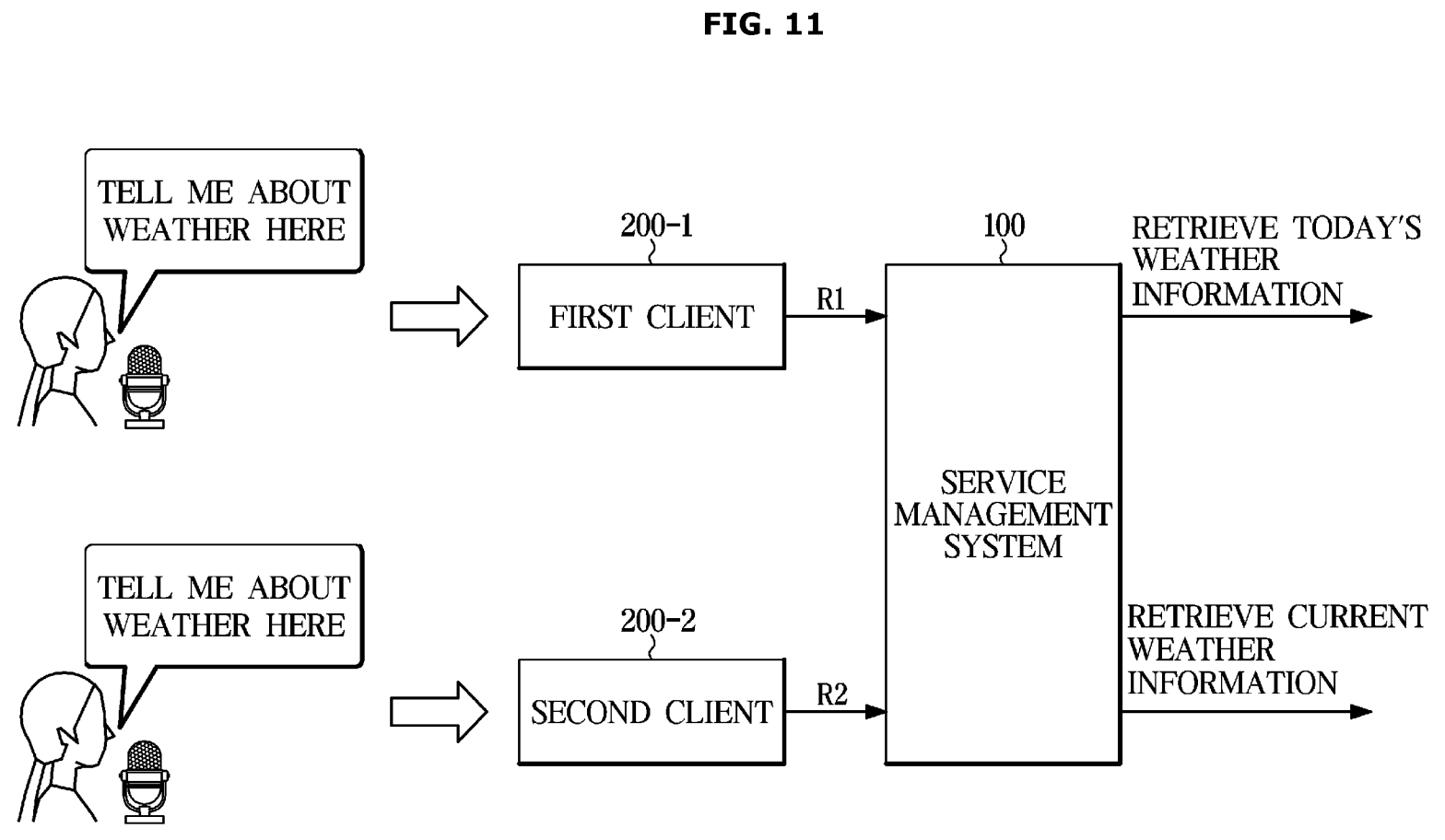

FIG. 10 is a diagram illustrating an example case in which a user's request is input to a service management system that does not allow request conversion rules to be set or edited for each client. FIG. 11 is a diagram illustrating an example case in which a user's request is input to a service management system.

Referring to FIG. 10, a user may input an utterance "Tell me about the weather here" to request weather information. It is assumed that to request weather information, the first client 200-1 wants to set a date of a target input (search target date) to "today" and the second client 200-2 wants to set a date of a target input (search target date) to "now."

If a user's request is input to a service management system 10 that does not allow request conversion rules to be set or edited for each client, as illustrated in FIG. 10, the first client 200-1 and the second client 200-2 may need to respectively include a conversion module 250-1 and a conversion module 250-2 to convert an input parameter and transmit a result of converting the input parameter to the service management system 10.

In an example, if a voice command uttered by a user does not include information about a search target date, the conversion module 250-1 of the first client 200-1 may need to convert a request to set the search target date to today (R1→R1') and the conversion module 250-2 of the second client 200-2 may need to convert a request to set the search target date to now (R2→R2'). This may increase a work load on the client 200 (e.g., the first client 200-1 and the second client 200-2 and cause an increase in down time.

In contrast, in FIG. 11, if a user's request R is input to the service management system 100, both the first client 200-1 and the second client 200-2 may directly transmit the request R by the user to a service management system 100 without converting the request R in advance. In other words, the first client 200-1 and the second client 200-2 do not include a conversion module in FIG. 11.

Request conversion rules which are set or edited directly by each of the first client 200-1 and the second client 200-2 may have already been stored in the service management system 100. Therefore, input parameters transmitted from the first client 200-1 and the second client 200-2 may be converted according to the stored request conversion rules to generate an input for retrieving today's weather information that the first client 200-1 desires and generate an input for retrieving current weather information that the second client 200-2 desires. In an example, parameter conversion rules for each client (e.g., client-specific parameter conversion rules) may be stored in the service management system 100, and the service management system 100 may apply the parameter conversion rules for inputs from each client device.

Therefore, each client 200 may need not an additional module to convert a user's request to receive a desired service, and the service management system 100 may need not update the system to change request conversion rules because the client 200 is capable of easily editing request conversion rules through a web page or an application.

Figure 12:
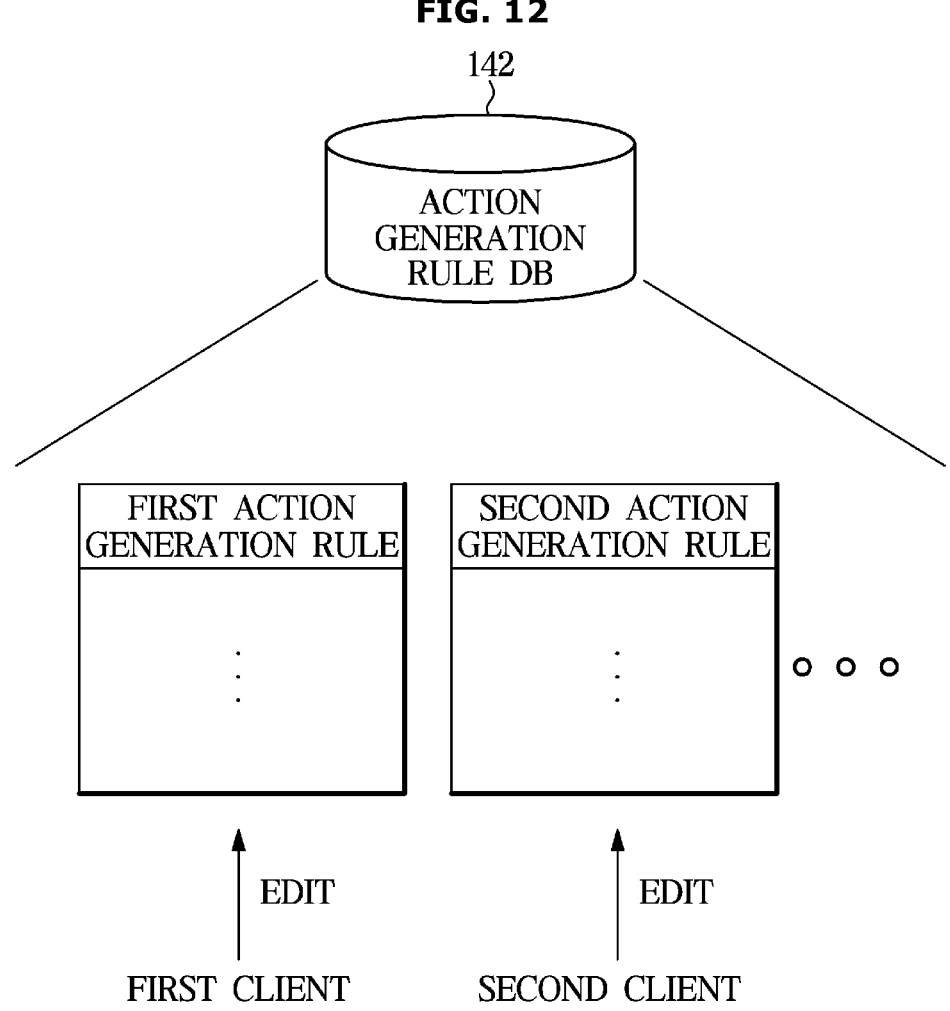
FIG. 12 is a diagram illustrating an example of action generation rules stored in a storage of a service management system.

FIG. 12 is a diagram illustrating an example of action generation rules stored in a storage of a service management system.

If the input processing module 110 converts an input parameter transmitted from the client 200 according to the request conversion rules stored in the storage 140, the main processing module 120 may generate an action corresponding to a received request using a result of converting the input parameter. In this case, the main processing module 120 may refer to an action generation rule DB 142 (e.g., stored in the storage 140) as illustrated in FIG. 12.

Referring to FIG. 12, the action generation rule DB 142 may store action generation rules for generating an action corresponding to a request for each client. An action corresponding to a request may represent an operation to be performed by the service management system 100 to provide a service requested by a user.

An action may be defined by details (e.g., detailed instructions) necessary to perform the action, and details of the action may vary according to a domain of a service. Values of such details may be determined according to an action generation rule.

For example, information such as date and location may be included as details if a domain of a service is weather, and information such as the title of a song, an artist's name, and a keyword may be included as details if a domain of a service is music.

For all domains, information about a service provider who will provide a service may be commonly included in an action generation rule. For example, one of service providers who provide weather information may be selected if a domain of a service is weather, and one of service providers who provide a music download or streaming service may be selected if a domain of a service is music.

Such action generation rules may be stored for each client 200. If the client 200 and the service management system 100 are first connected to each other, action generation rules may be set to default values set by the service management system 100 and the client 200 may edit the action generation rules on a designated webpage or application.

Alternatively or additionally, action generation rules may be set as desired by the client 200 if the client 200 and the service management system 100 are connected to each other. In this case, the action generation rules may also be freely edited after they are set.

Figure 13:
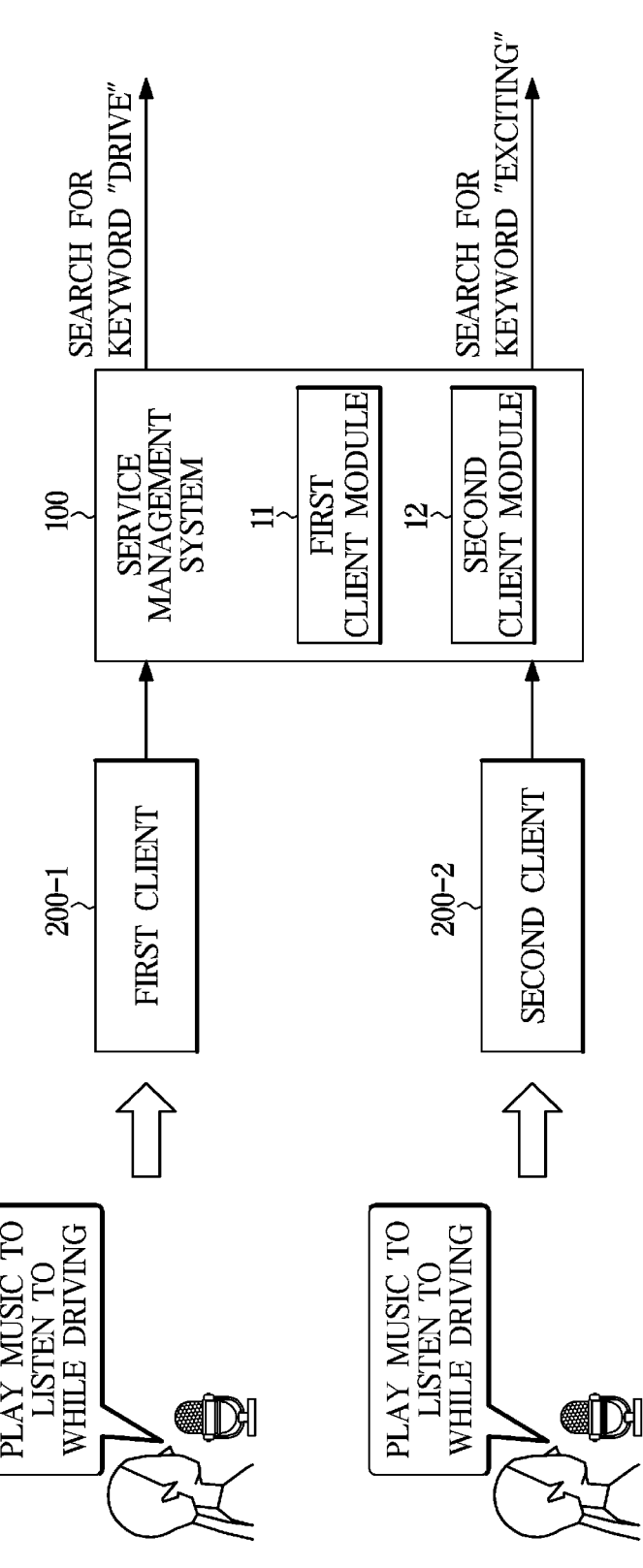
FIG. 13 is a diagram illustrating a case in which a user's request is input to a service management system that does not allow action generation rules to be set or edited for each client.
Figure 14:
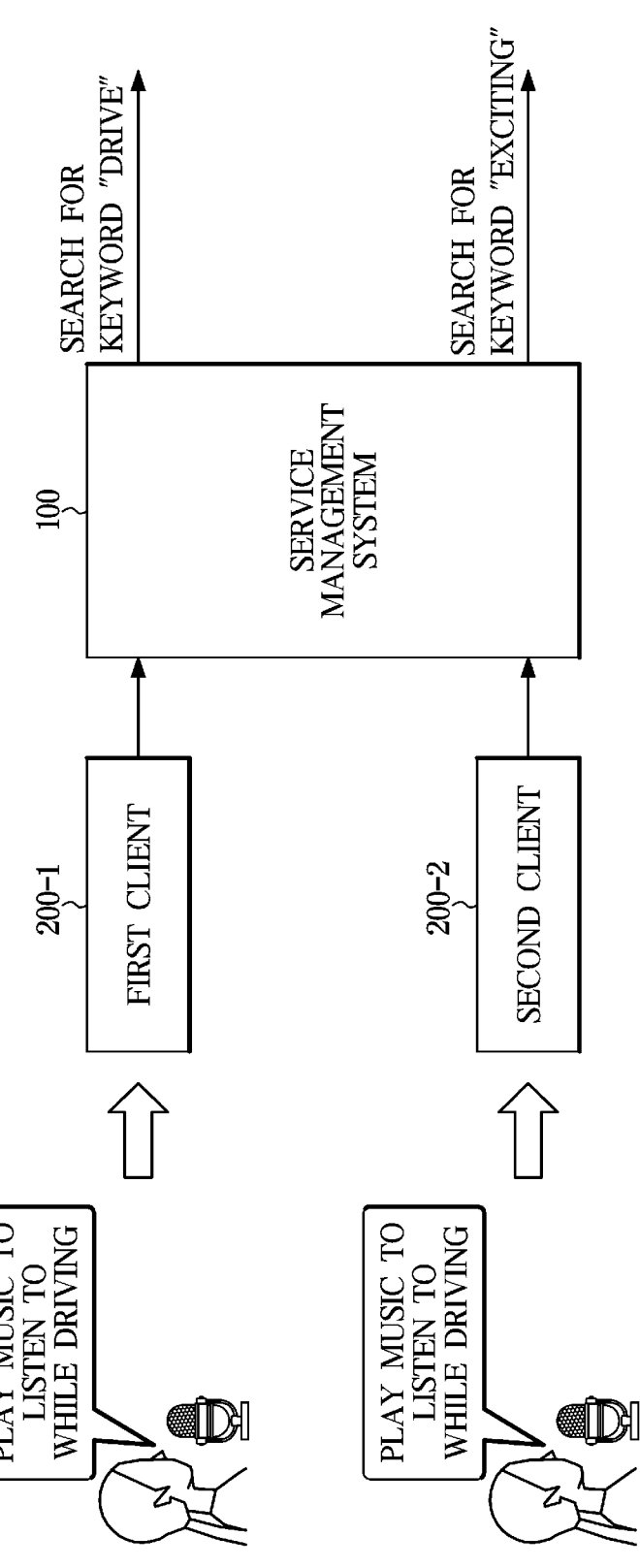
FIG. 14 is a diagram illustrating a case in which a user's request is input to a service management system.

FIG. 13 is a diagram illustrating a case in which a user's request is input to a service management system that does not allow action generation rules to be set or edited for each client. FIG. 14 is a diagram illustrating a case in which a user's request is input to a service management system.

Referring to FIG. 13, a user may input an utterance "Play music to listen to while driving" to request to play music. It is assumed that a first client 200-1 wants to search for a service provider using "drive" as a keyword when "drive" is input as a keyword and a second client 200-2 wants to search for a service provider using "exciting" as a keyword when "drive" is input as a keyword.

In the case of a service management system 10 that does not allow action generation rules to be set or edited for each client, first and second client modules 11 and 12 or an engine may need to be newly developed to perform different actions for the same input whenever a client 200 is added, as shown in FIG. 13.

In the above example, because the first client 200-1 and the second client 200-2 desire to perform different actions for the same input keyword, the first client module 11 for performing the action desired by the first client 200-1 and the second client module 12 for performing the action desired by the second client 200-2 may need to be included in the service management system 100.

In contrast, in FIG. 14, if a user's request is input to the service management system 100, even if a separate module for each of the clients 200-1 and 200-2 is not provided, the service management system 100 can perform a desired action that each of the clients 200-1 and 200-2 wants for the same keyword input (e.g., as shown in FIG. 14). In other words, the service management system 100 does not include a client module. For example, by storing client-specific action generation rules, which may be set and/or edited by a client. The client-specific action generation rules may be stored in the service management system 100 and/or other storage devices.

Figure 16:
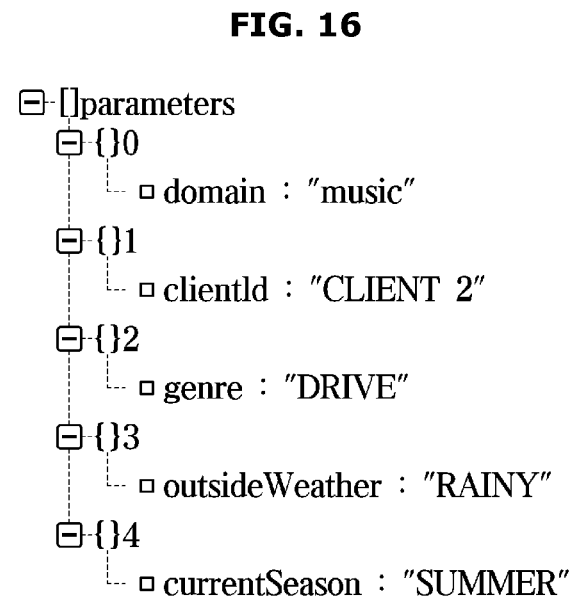
Figure 17:
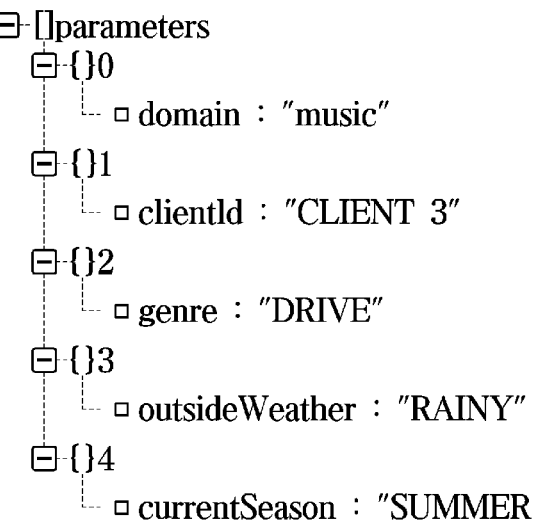

FIGS. 15 to 17 are diagrams illustrating examples of an input parameter converted by an input processing module of a service management system. FIGS. 18 to 20 are diagrams illustrating examples of action generation rules referenced by a main processing module of a service management system.

In the examples, a first client, a second client, and a third client request to play music of a drive genre in the same environment. The drive genre may be associated with music contents that are (e.g., frequently) requested by vehicle drivers and/or passengers.

FIG. 15 illustrates a result of the input processing module 110 converting an input parameter for the first client, FIG. 16 illustrates a result of the input processing module 110 converting an input parameter for the second client, and FIG. 17 illustrates a result of the input processing module 110 converting an input parameter for the third client.

Even when input parameters of different formats are input from the first to third clients, the input parameters may be normalized to the same format (e.g., by the input processing module 110) as shown in FIGS. 15, 16 and 17.

FIG. 18 is a table showing action generation rules of a first client stored in the action generation rule DB 142. The first client may edit action generation rules on a web page or an application to differently set a keyword (target genre) to be searched for as "sunny day," "gloomy," "drive in rain," or "drive" according to weather (clear/cloudy/rainy/all) when a drive genre is input.

The action generation rules for each client may be set by a computing device (e.g., the service management system 100) using an artificial intelligence (AI) engine (e.g., based on any machine learning algorithms, deep learning algorithms, and/or any other AI-based algorithms). The auto-generated action generation rules (e.g., by the AI engine) may be common to a group of user clients associated with the service management system 100. Each client may be provided with a visual display displaying the auto-generated action generation rules (e.g., action generation rules having a format similar to those illustrated in FIG. 20) and may further customize the action generation rules. The action generation rules may become client-specific by different customizations by different clients.

A search for "sunny day", "gloomy" or "drive" may be set to be performed at service provider 'A music', and a search for "drive in rain" may be set to be performed at service provider 'B music'.

FIG. 19 is a table showing action generation rules of a second client stored in the action generation rule DB 142. The second client may edit action generation rules through a web page or an application to set a keyword (target genre) to be searched for as "summer" (summer) or "drive" (all) according to whether the season when a drive genre is input is summer or not.

In addition, a service provider may be set to 'A music' regardless of season.

FIG. 20 is a table showing action generation rules of a third client stored in the action generation rule DB 142. The third client does not edit an action generation rule, and according to the action generation rule (e.g., a default action general rule or an action generation rule generated by an AI engine for one or more clients), if a drive genre is input, A music may generate an action to search for "drive" in A music regardless of weather or season.

The main processing module 120 may generate an action to search B music for "drive in rain" on the basis of the normalized input parameter of the first client shown in FIG. 15 and the action generation rules of the first client shown in FIG. 18.

The main processing module 120 may generate an action to search A music for "summer" on the basis of the normalized input parameter of the second client shown in FIG. 16 and the action generation rules of the second client shown in FIG. 19.

The main processing module 120 may generate an action to search A music for "drive" on the basis of the normalized input parameter of the third client shown in FIG. 17 and the action generation rules of the third client shown in FIG. 20.

Figure 21:
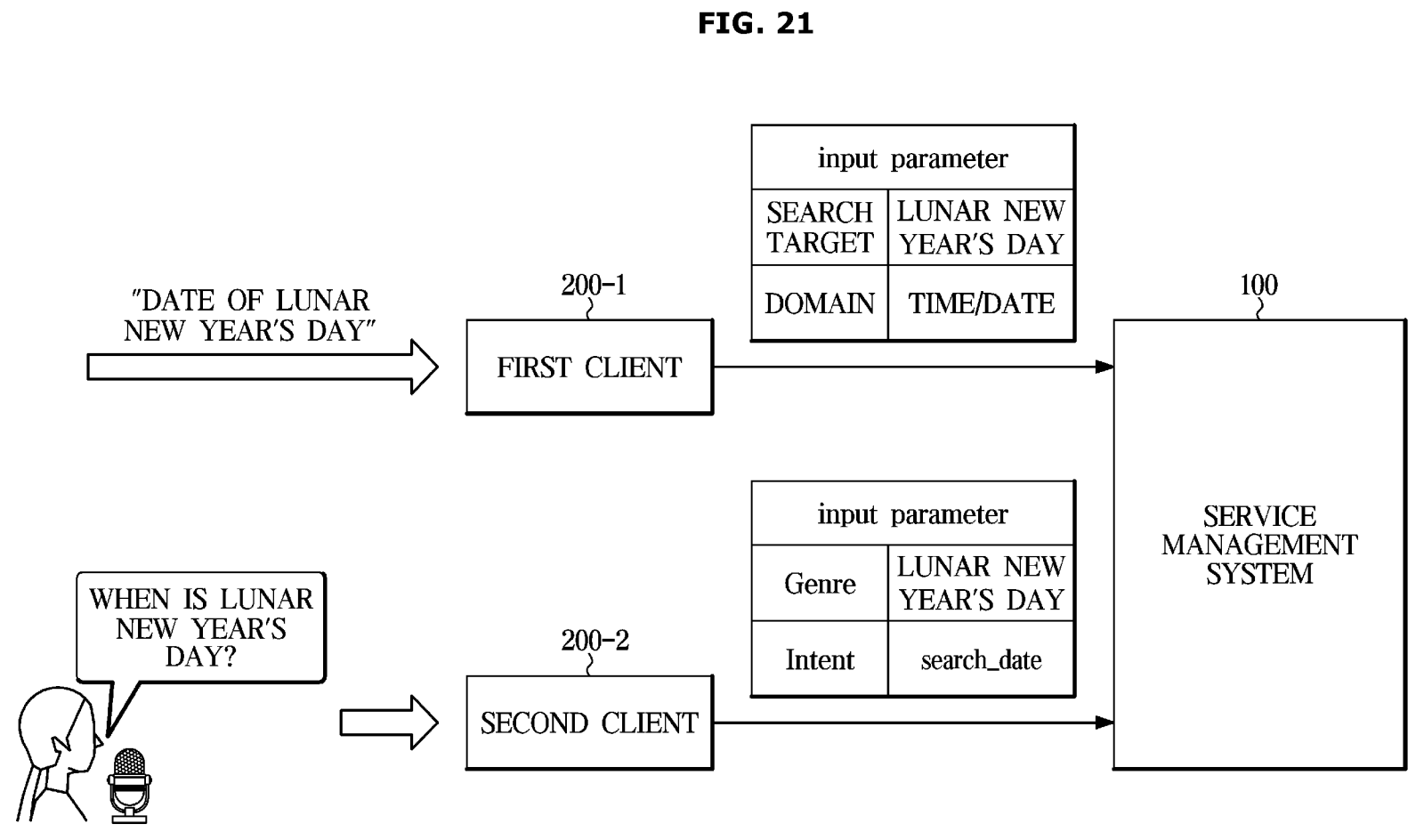
Figure 22:
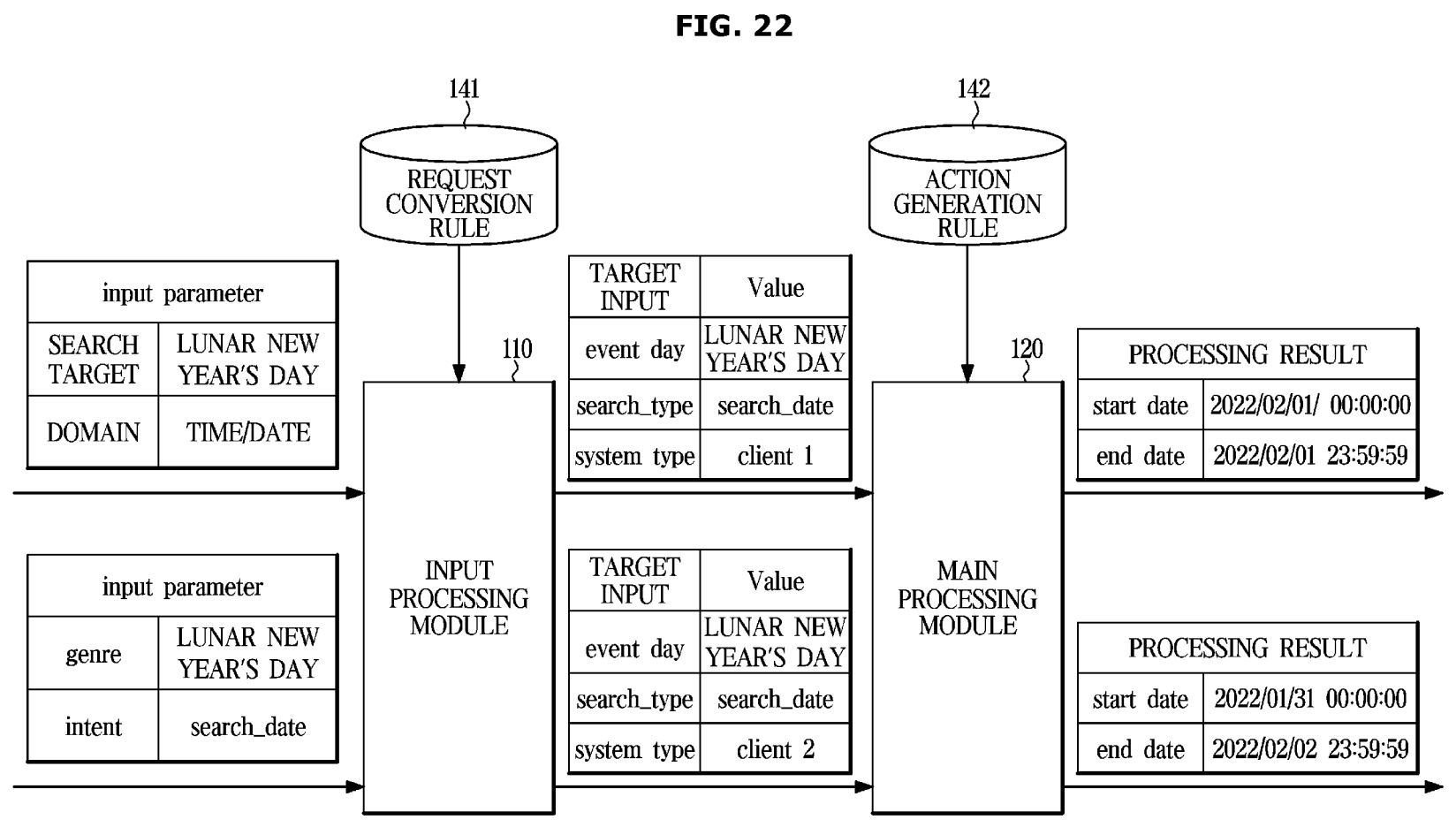

FIG. 21 is a diagram illustrating an example in which a service management system receives input parameters from first and second clients. FIG. 22 is a diagram illustrating an example operation performed by a service management system, which receives an input parameter, on the basis of request conversion rules and action generation rules.

FIGS. 21 and 22 illustrate examples in which both a user of a first client 200-1 and a user of a second client 200-2 input "Lunar New Year's Day" as a keyword to request weather information service.

Referring to FIG. 21, the user of the first client 200-1 may input "the date of Lunar New Year's Day" through manipulation of an input device, and the user of the second client 200-2 may input a voice command "When is Lunar New Year's Day?" through a microphone of a user terminal.

Both the first client 200-1 and the second client 200-2 may transmit the users' requests for an information search service to the service management system 100.

In this case, the request transmitted from the first client 200-1 may include an input parameter including information about a search target (Lunar New Year's Day) and a domain (time/date). The second client 200-2 may apply voice recognition and natural language understanding technology to the voice command transmitted from the user terminal to identify a slot (event: Lunar New Year's Day) and an intent (search_date) corresponding to the voice command from the user. The request transmitted from the second client 200-2 may include an input parameter including information about the slot and the intent.

As described above, the input processing module 110 may normalize the input parameters, which may be input in various formats from the clients 200-1 and 200-2, by converting each of the input parameters into a normalized format processable by the service management system 100.

Referring to FIG. 22, the input processing module 110 may convert the input parameter transmitted from the first client 200-1 to a normalized format on the basis of request conversion rules of the first client 200-1 stored in the request conversion rule DB 141.

The input processing module 110 may convert the input parameter transmitted from the second client 200-2 to the normalized format on the basis of request conversion rules of the second client 200-2 stored in the request conversion rule DB 141.

Through the conversion of the input parameters, the input parameters that are input in different formats may be normalized to input parameters that are in a format (target input: event Day, Search_type, System_type) required by the service management system 100.

Even if information about time/date such as an anniversary or a holiday is requested, a desired search range may vary for the client 200 even when information about the same anniversary or holiday is requested.

In an example, although both the first client 200-1 and the second client 200-2 request information about "Lunar New Year's Day," the first client 200-1 may request the date of Lunar New Year's Day and the second client 200-2 may request the dates of the Lunar New Year holidays.

In this case, the first client 200-1 may edit action generation rules through a web page or an application and designate a search range as Lunar New Year's Day, and the second client 200-2 may designate a search range as Lunar New Year holidays.

In the case of a time/date domain, the service management system 100 may directly provide a service without requesting the service provider 300-1, . . . , 300-m to provide the service. Accordingly, processing results of the input processor 120 in response to requests from each of the clients 200-1 and 200-2 may be transmitted to the clients 200-1 and 200-2 through the communication module 150.

Figure 23:
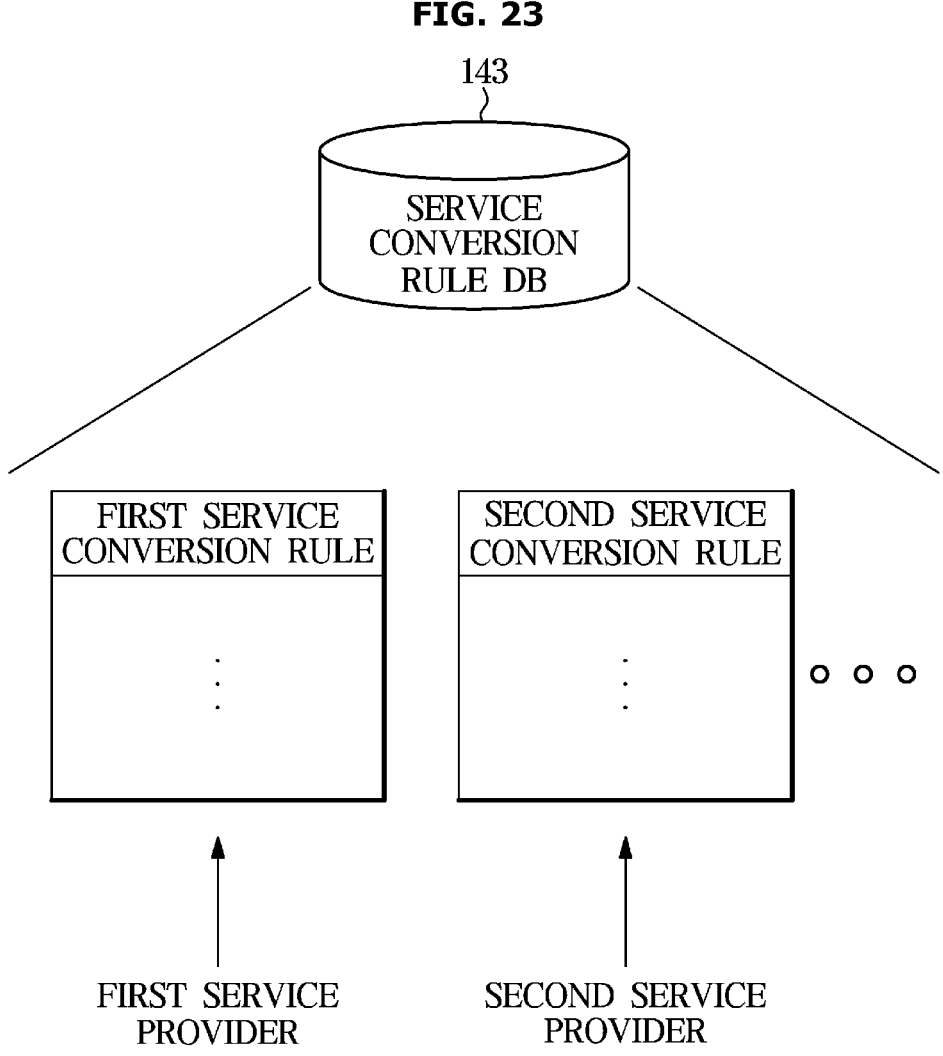
FIG. 23 is a diagram illustrating an example of service conversion rules stored in a storage of a service management system.

FIG. 23 is a diagram illustrating an example of service conversion rules stored in a storage of a service management system.

If the main processing module 120 generates an action corresponding to a user's request on the basis of an input parameter transmitted from the client 200, the service call module 130 may call the service provider 300 corresponding to the generated action.

Here, the service provider 300 corresponding to the generated action may be a service provider determined by an action generation rule. As described above, for the same action, a different service provider 300 may be set to correspond to each client 200.

Calling the service provider 300 may include transmission of a call signal for requesting the service provider 300 to provide a service, and the call signal for requesting the service may include information about the action generated by the main processing module 120.

The call signal transmitted to the service provider 300 may be generated according to an input format required by the service provider 300, and information about the input format required by the service provider 300 may be included in a service conversion rule DB 143 (e.g., stored in the storage 140).

An input format for calling the service provider 300 may vary according to the service provider 300. More specifically, a case in which both the first service provider 300-1 and the second service provider 300-2 provide navigation services and the client 200 requests guidance regarding a route to Gangnam Station will be described as an example.

Both the first service provider 300-1 and the second service provider 300-2 require destination information to provide a navigation service. However, the first service provider 300-1 may obtain destination information from a value of a destination item, and the second service provider 300-2 may obtain destination information from a value of a point-of-interest (POI) item.

In this case, the service call module 130 may convert an input format included in a call signal into "destination: Gangnam Station" to request the first service provider 300-1 to provide a service, and convert the input format included in the call signal into "POI: Gangnam Station" to request the second service provider 300-2 to provide a service.

If the service management system 100 transmits a call signal to the service provider 300 to request a service, a result signal may be provided from the service provider 300. The result signal provided from the service provider 300 may be a signal for providing a service requested by the service management system 100, and may be a signal indicating certain information or a signal including certain content.

Formats of result signals provided from service providers 300 may be different from each other. The service call module 130 may normalize the format of the result signal provided from the service provider 300 by converting the format into a format processable by the service management system 100 on the basis of the service conversion rule DB 143.

As illustrated in FIG. 23, the service conversion rule DB 143 may include service conversion rules for each of the service providers 300-1, 300-2, . . . , 300-m, and each of the service providers 300-1, 300-2, . . . , 300-m may freely set or edit the service conversion rules through a web page or an application.

Figure 24:
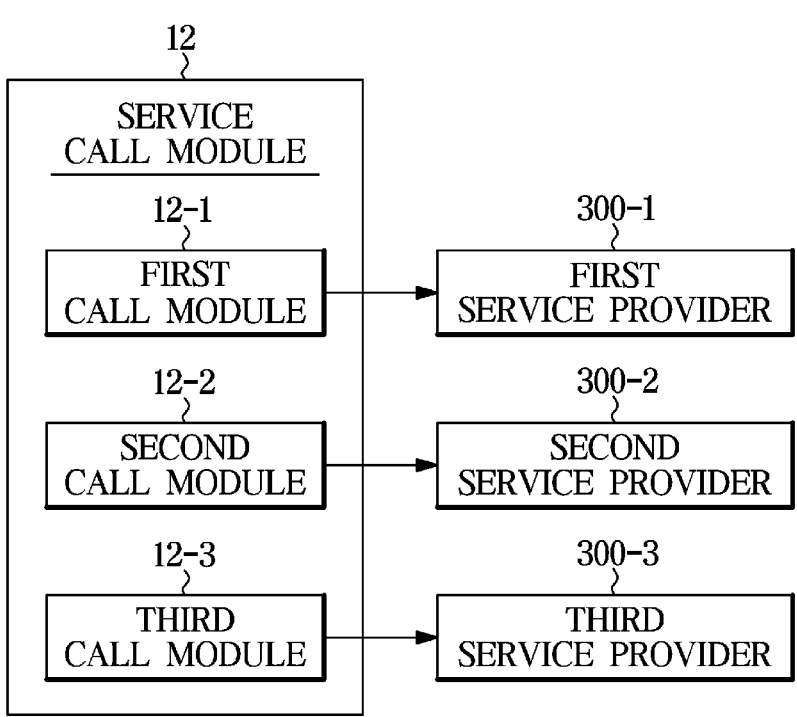
FIG. 24 is a diagram illustrating a case in which a service provider is connected to a service management system that does not allow service conversion rules to be set or edited for each service provider.
Figure 25:
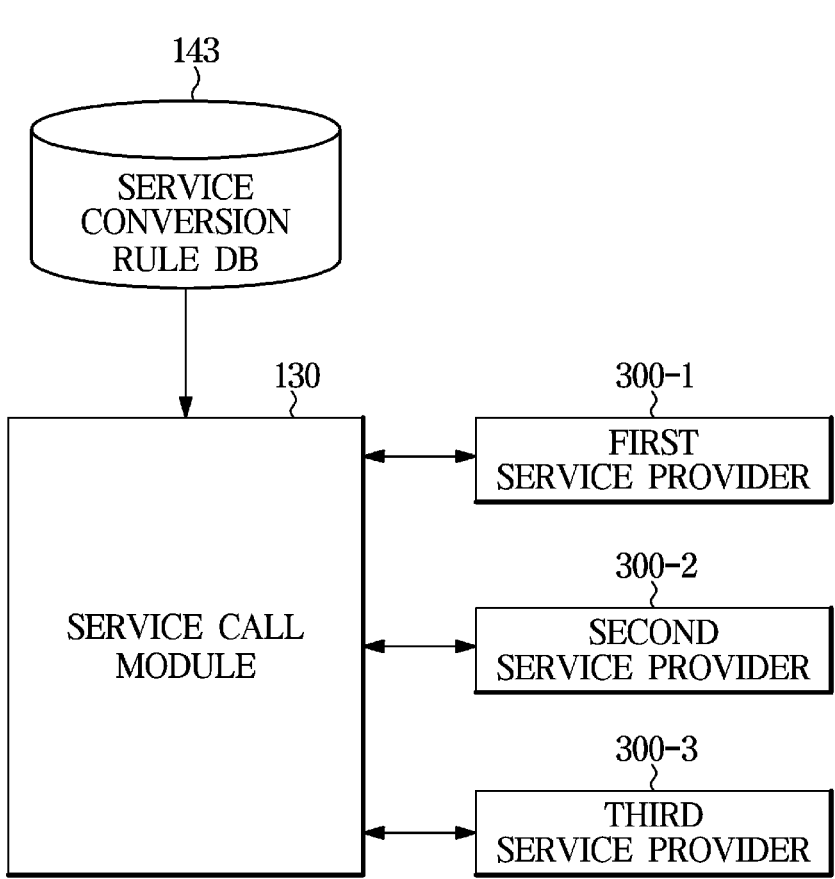
FIG. 25 is a diagram illustrating a case in which a service provider is connected to a service management system.

FIG. 24 is a diagram illustrating a case in which a service provider is connected to a service management system that does not allow service conversion rules to be set or edited for each service provider. FIG. 25 is a diagram illustrating a case in which a service provider is connected to a service management system.

Referring to FIG. 24, in the case of the service management system 10 that does not allow the service provider 300 to freely set or edit a service conversion rule, in order to additionally connect second and third service providers 300-2 and 300-3 as well as an existing first service provider 300-1, a second call module 12-2 for calling the second service provider 300-2 and a third call module 12-3 for calling the third service provider 300-3 may need to be additionally developed in addition to a first call module 12-1 for calling the existing first service provider 300-1, and the service management system 10 should be updated.

Even when an input format or an output format of the existing first service provider 300-1 is changed, a new module for supporting the changed input or output format may need to be developed and the service management system 10 may need to be updated whenever a new module is developed.

In contrast, in the case of a service management system 100 shown in FIG. 25, service conversion rules may be prepared using a tool (e.g., provided through a web page or an application) to connect new second and third service providers 300-2 and 300-3 as shown in FIG. 25, and in this case, modules of the service management system 100 may need not be developed and the system 100 may need not be substantially updated.

Even when an input format or an output format of an existing first service provider 300-1 is changed, the first service provider 300-1 may reflect a change in the input or output format simply by editing service conversion rules through a web page or an application without having to develop a new module or update the system to support the changed input or output format.

Figure 28:
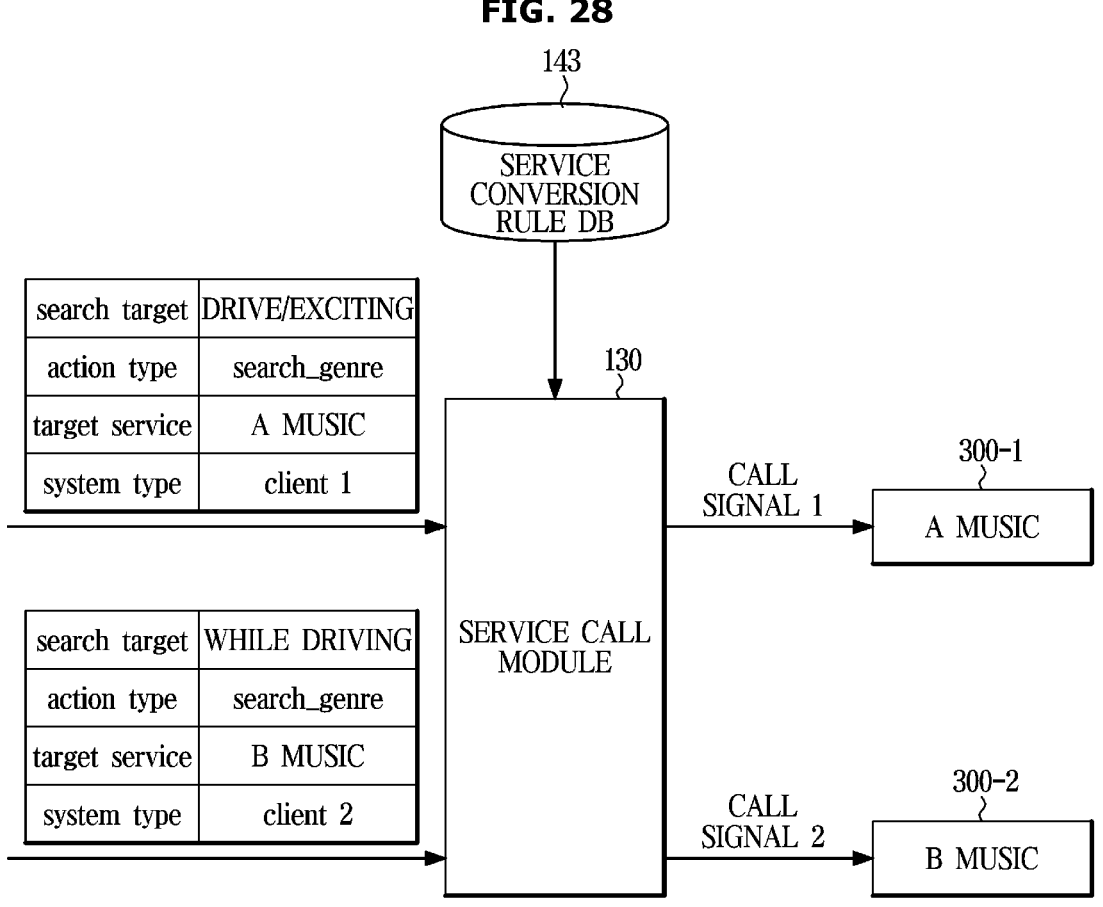

FIGS. 26, 27 and 28 are diagrams illustrating examples of an operation of a service management system to which a request for a music playback service is input.

FIGS. 26, 27 and 28 illustrate examples in which both a user of a first client 200-1 and a user of a second client 200-2 input "drive" as a keyword to request a music playback service.

Referring to FIG. 26, a user of a first client 200-1 may input "drive music genre" by manipulating an input device, and a user of a second client 200-2 may input a voice command "Play music to listen to while driving" through a microphone of a user terminal.

Both the first client 200-1 and the second client 200-2 transmit users' requests for a music playback service to a service management system 100, but the types of input parameters included in the transmitted requests may be different from each other.

For example, the request transmitted from the first client 200-1 may include an input parameter including information about a search target (drive genre) and a domain (music).

The second client 200-2 may apply voice recognition and natural language understanding technology to the voice command transmitted from a user terminal to identify a slot (genre: drive) and an intent (play_music) corresponding to the voice command from the user. The request transmitted by the second client 200-2 may include an input parameter including information about a slot (genre: drive) and an intent (play_music).

Referring to FIG. 27, an input processing module 110 may convert a format of an input parameter included in a request received from a first client 200-1 and a format of an input parameter included in a request received from a second client 200-2 on the basis of request conversion rules stored in units of clients 200 in a request conversion rule DB 141.

For example, if a target input determined by the service management system 100 is genre, search_type, and system type, the input processing module 110 may normalize input parameters received from the first client 200-1 and the second client 200-2 by converting each of the input parameters into a format of an input parameter including values of genre, search_type, and system type, respectively.

The main processing module 120 may generate an action corresponding to the request from the first client 200-1 and an action corresponding to the request from the second client 200-2 on the basis of action generation rules stored in units of clients 200 in the action generation rule DB 142.

Even when the same input parameter is input from the input processing module 110, the main processing module 120 may generate different actions, for example, if the first client 200-1 and the second client 200-2 set or edit action generation rules differently.

For example, the first client 200-1 may set a search keyword as "drive & exciting" when "drive" is input as a genre, and the second client 200-2 may set a search keyword as "while driving" when "drive" is input as a genre.

The first client 200-1 may set a service provider for a music domain as A music, and the second client 200-2 may set a service provider for a music domain as B music.

In this case, as shown in FIG. 27, some (search target and target provider) details of the action corresponding to the request from the first client 200-1 may be different from some details of the action corresponding to the request from the second client 200-2.

The service call module 130 may call a service provider corresponding to an action generated by the main processing module 120. Referring to FIG. 28, A music 300-1 may be called for the request from the first client 200-1, and B music 300-2 may be called for the request from the second client 200-2.

In this case, the service call module 130 may refer to the service conversion rule DB 143 to generate a call signal according to an input format set by each of the service providers 300-1 and 300-2.

The service call module 130 may generate a first call signal 1 according to an input format set by the A music 300-1 and may generate a second call signal according to an input format set by the B music 300-2.

The first call signal may include a signal requesting to retrieve a "drive & exciting" genre, and the second call signal may include a signal requesting to retrieve a "while driving" genre.

Although the communication module 150 is omitted in FIG. 28, the first call signal may be transmitted to the A music 300-1 through the communication module 150, and the second call signal may be transmitted to the B music 300-2 through the communication module 150.

A result signal transmitted from the A music 300-1 and a result signal transmitted from the B music 300-2 may be normalized to formats processable by the service management system 100 through conversion by the service call module 130.

In accordance with an aspect of the present disclosure, a service management system includes a communication module configured to receive a request for a service from at least one of a plurality of clients and transmit a call signal requesting the service to at least one of a plurality of service providers, an input processing module configured to convert an input parameter included in the request, a main processing module configured to generate an action corresponding to the request on the basis of a result of converting the input parameter, a service call module configured to generate the call signal to be transmitted to the at least one service provider on the basis of the generated action, and a storage storing at least one of request conversion rules to be used to convert the input parameter included in the request by the input processing module, action conversion rules to be used to generate the action by the action generation module, or service conversion rules to be used to generate the call signal by the service call module, wherein the action generation rules are stored in units of the plurality of clients and are settable or editable by the plurality of clients.

The action generation rules may include details of the action defined according to the input parameter.

The action generation rules may be settable or editable by the plurality of clients through a web page or an application.

The action generation rules may include a definition of a service provider corresponding to the action for each of the plurality of clients among the plurality of service providers.

The service conversion rules may include a definition of information and a format that are necessary to request each of the plurality of service providers to provide the service.

The service conversion rules may be settable or editable by the plurality of service providers through a web page or an application.

When a new service provider is registered in the service management system, the service conversion rules may be settable by the new service provider through a web page or an application.

According to the request conversion rules, the input parameter included in the request may be normalized to a format of an input parameter required by the service management system.

The request conversion rules may include a definition of at least one of a path for obtaining a target input value required by the service management system for each of the plurality of clients or a default value to be used when the target input value cannot be obtained.

The request conversion rules may be settable or editable by the plurality of clients through a web page or an application.

In accordance with another aspect of the present disclosure, a service management method may include receiving a request for a service from at least one of a plurality of clients, converting an input parameter included in the request on the basis of stored request conversion rules, generating an action corresponding to the request on the basis of a result of converting the input parameter and the stored action generation rules, and generating a call signal to be transmitted to at least one service provider among a plurality of service providers on the basis of the generated action and stored service conversion rules, wherein the action generation rules are stored in units of the plurality of clients and are settable or editable by the plurality of clients.

The action generation rules may include details of the action defined according to the input parameter.

The action generation rules may be settable or editable by the plurality of clients through a web page or an application.

The action generation rules may include a definition of a service provider corresponding to the action for each of the plurality of clients among the plurality of service providers.

The service conversion rules may include a definition of information and a format that are necessary to request each of the plurality of service providers to provide the service.

The service conversion rules may be settable or editable by the plurality of service providers through a web page or an application.

When a new service provider is registered in the service management system, the service conversion rules may be settable by the new service provider through a web page or an application.

According to the request conversion rules, the input parameter included in the request may be normalized to a format of an input parameter required by a service management system.

The request conversion rules may include a definition of at least one of a path for obtaining a target input value required by the service management system for each of the plurality of clients or a default value to be used when the target input value cannot be obtained.

The request conversion rules may be settable or editable by the plurality of clients through a web page or an application.

In accordance with another aspect of the present disclosure, a non-transitory computer-readable storage medium may store instructions configured to perform: receiving, by a communication module, a request for a service from at least one of a plurality of clients; converting, by an input processing module, an input parameter included in the request on the basis of stored request conversion rules; generating, by a main processing module, an action corresponding to the request on the basis of a result of converting the input parameter and the stored action generation rules; and generating, by a service call module, a call signal to be transmitted to at least one service provider among a plurality of service providers on the basis of the generated action and stored service conversion rules, wherein the action generation rules are stored in units of the plurality of clients and are settable or editable by the plurality of clients.

As is apparent from the above description, according to a service management system and method, it is possible to easily connect to a new client or a new service provider without developing or updating a new system. Therefore, a domain of a service can be easily expanded for a client, and clients can be easily expanded for a service provider.

Further, a customized service can be provided to a client by allowing the client to directly edit details of a desired service.

As is apparent from the above description, according to a service management system and method, it is possible to easily connect to a new client or a new service provider without developing or updating a new system. Therefore, a domain of a service can be easily expanded for a client, and clients can be easily expanded for a service provider.

Further, a customized service can be provided to a client by allowing the client to directly edit details of a desired service.

The service management methods according to various examples set forth herein may be stored in a recording medium in the form of instructions executable by a computer. The instructions may be stored in the form of program code, and the operations of the embodiments set forth herein may be produced when the instructions are executed by a processor. The recording medium may be embodied as a non-transitory computer-readable recording medium.

Examples of the computer-readable recording medium include various types of recording media storing instructions interpretable by a computer. Examples of the computer-readable recording medium may include a read-only memory (ROM), a random access memory (RAM), a magnetic tape, a magnetic disk, a flash memory, an optical data storage device, etc.

The illustrative examples set forth herein have been described above with reference to the accompanying drawings. It will be understood by those of ordinary skill in the technical field to which the present disclosure pertains that the present disclosure may be implemented in a different form than those of the features set forth herein without departing from the technical idea or essential features of the present disclosure. These examples are only exemplary examples and should not be interpreted in a restrictive manner.

What is claimed is:

1. A service management system comprising:
one or more processors; and
memory storing instructions that, when executed by the one or more processors, cause the service management system to:
receive a request for a service of an application program from at least one client of a plurality of clients, wherein the request indicates an input parameter associated with an utterance of a user;
convert, based on at least one request conversion rule, the input parameter to a converted parameter;
generate, based on information for generating an action not identified from the utterance, based on the converted parameter, and based on at least one action generation rule associated with the at least one client, an output parameter of an action corresponding to the request and associated with the at least one client, wherein at least a portion of the at least one action generation rule is settable or editable by the at least one client via a web page or an application, and the at least one action generation rule defines a service provider among a plurality of service providers;

generate, based on the generated output parameter of the action and based on at least one service conversion rule, an instruction signal requesting the service for the at least one client; and transmit, to at least one of the plurality of service providers, the instruction signal.

2. The service management system according to claim 1, wherein the at least one action generation rule comprise at least one parameter of the action linked to the converted parameter.

3. The service management system according to claim 2, wherein the at least one parameter of the action comprises an indication of the service provider, of the plurality of service providers, corresponding to the action for the at least one client.

4. The service management system according to claim 1, wherein the at least one service conversion rule comprises a definition of information and a format that are necessary to request each of the plurality of service providers to provide one or more services.

5. The service management system according to claim 4, wherein the instructions, when executed by the one or more processors, cause the service management system to configure the at least one service conversion rule to be settable or editable by the plurality of service providers via a web page or an application.

6. The service management system according to claim 4, wherein, in response to registration of a new service provider in the service management system, the instructions, when executed by the one or more processors, cause the service management system to configure the at least one service conversion rule settable by the new service provider via a web page or an application.

7. The service management system according to claim 1, wherein, based on the at least one request conversion rule, the instructions, when executed by the one or more processors, cause the service management system to convert the input parameter indicated by the request to the converted parameter in a normalized format conforming to the service management system.

8. The service management system according to claim 7, wherein the at least one request conversion rule comprises at least one of:

a definition of at least one of a path for obtaining a target input value required by the service management system for each of the plurality of clients; or a default value to be used in case that the target input value cannot be obtained.

9. The service management system according to claim 8, wherein the instructions, when executed by the one or more processors, cause the service management system to configure the at least one request conversion rule to be settable or editable by the plurality of clients via a web page or an application.

10. The service management system of claim 1, wherein the instructions, when executed by the one or more processors, cause the service management system to:

cause, based on the instruction signal, a vehicle associated with the user to control an application of the vehicle to execute, based on at least one value associated with the output parameter of the action, the service for the at least one client.

11. A service management method comprising:

receiving, by a computing device, a request for a service of an application program from at least one client of a plurality of clients, wherein the request indicates an input parameter associated with an utterance of a user;

converting, by the computing device and based on at least one request conversion rule, the input parameter to a converted parameter;

based on information for generating an action not identified from the utterance, based on the converted parameter, and based on at least one action generation rule associated with the at least one client, generating, by the computing device, an output parameter of an action corresponding to the request and associated with the at least one client, wherein at least a portion of the at least one action generation rule is settable or editable by the at least one client via a web page or an application, and the at least one action generation rule defines a service provider among a plurality of service providers;

generating, by the computing device and based on the generated output parameter of the action and based on at least one service conversion rule, an instruction signal requesting the service for the at least one client; and transmitting, by the computing device to at least one of the plurality of service providers, the instruction signal.

12. The service management method according to claim 11, wherein the at least one action generation rule comprises at least one parameter of the action linked to the converted parameter.

13. The service management method according to claim 12, wherein the at least one parameter of the action comprises an indication of the service provider, of the plurality of service providers, corresponding to the action for the at least one client.

14. The service management method according to claim 11, wherein the at least one service conversion rule comprises a definition of information and a format that are necessary to request each of the plurality of service providers to provide one or more services.

15. The service management method according to claim 14, further comprising configuring the at least one service conversion rule to be settable or editable by the plurality of service providers via a web page or an application.

16. The service management method according to claim 14, further comprising, in response to registration of a new service provider in a service management system, configuring the at least one service conversion rule to be settable by the new service provider via a web page or an application.

17. The service management method according to claim 11, wherein the converting comprises:

converting, based on the at least one request conversion rule, the input parameter indicated by the request to the converted parameter in a normalized format conforming to a service management system.

18. The service management method according to claim 17, wherein the at least one request conversion rule comprises at least one of:

a definition of at least one of a path for obtaining a target input value required by the service management system for each of the plurality of clients; or a default value to be used in case that the target input value cannot be obtained.

19. The service management method according to claim 18, further comprising configuring the at least one request conversion rule to be settable or editable by the plurality of clients via a web page or an application.

20. A non-transitory computer-readable storage medium storing instructions that, when executed, cause:

receiving a request for a service of an application program from at least one client of a plurality of clients, wherein the request indicates an input parameter associated with an utterance of a user;

converting, based on at least one request conversion rule, the input parameter to a converted parameter;

generating, based on information for generating an action not identified from the utterance, based on the converted parameter, and based on at least one action generation rule associated with the at least one client, an output parameter of an action corresponding to the request and associated with the at least one client, wherein at least a portion of the at least one action generation rule is settable or editable by the at least one client via a web page or an application, and the at least one action generation rule defines a service provider among a plurality of service providers;

generating, based on the generated output parameter of the action and based on at least one service conversion rule, an instruction signal requesting the service for the at least one client; and transmitting, to at least one of the plurality of service providers, the instruction signal.

21. The non-transitory computer-readable storage medium of claim 20, wherein the instructions, when executed, cause:

causing, based on the instruction signal, a vehicle associated with the user to control an application of the vehicle to execute, based on at least one value associated with the output parameter of the action, the service for the at least one client.

* * * * *